(12) United States Patent
Krasnoff

(10) Patent No.: US 11,761,498 B2
(45) Date of Patent: Sep. 19, 2023

(54) EXPANDING ROTOR BRAKE

(71) Applicant: Duplicent, LLC, Santa Monica, CA (US)

(72) Inventor: Curren Emmett Krasnoff, Santa Monica, CA (US)

(73) Assignee: Duplicent, LLC, Santa Monica, CA (US)

(*) Notice: Subject to any disclaimer, the term of this patent is extended or adjusted under 35 U.S.C. 154(b) by 0 days.

(21) Appl. No.: 17/465,369

(22) Filed: Sep. 2, 2021

(65) Prior Publication Data

US 2021/0396282 A1 Dec. 23, 2021

Related U.S. Application Data

(63) Continuation of application No. PCT/US2021/025488, filed on Apr. 2, 2021.

(60) Provisional application No. 63/005,366, filed on Apr. 5, 2020.

(51) Int. Cl.
*F16D 65/18* (2006.01)
*F16D 55/226* (2006.01)

(52) U.S. Cl.
CPC .......... *F16D 55/226* (2013.01); *F16D 65/18* (2013.01)

(58) Field of Classification Search
CPC .......... F16D 55/02; F16D 55/25; F16D 55/04; F16D 55/22; F16D 55/24; F16D 55/36; F16D 55/44; F16D 55/14; F16D 55/226; F16D 65/18
See application file for complete search history.

(56) References Cited

U.S. PATENT DOCUMENTS

| | | | | |
|---|---|---|---|---|
| 2,799,366 A | * | 7/1957 | Zindler | F16D 55/14 188/106 R |
| 6,247,560 B1 | | 6/2001 | Bunker | |
| 6,508,336 B1 | * | 1/2003 | El-Kassouf | F16D 55/40 188/71.2 |
| 6,543,596 B2 | * | 4/2003 | Martin | F16D 25/0638 192/85.4 |
| 8,733,511 B2 | * | 5/2014 | Baumgartner | F16D 55/36 188/71.5 |
| 9,797,463 B1 | | 10/2017 | Skurkis et al. | |
| 2002/0108819 A1 | * | 8/2002 | Williams | F16D 65/12 188/73.1 |
| 2004/0035653 A1 | * | 2/2004 | Christensen | B64D 33/04 188/135 |
| 2004/0065515 A1 | * | 4/2004 | Seeley | F16D 65/095 188/71.5 |
| 2004/0108174 A1 | | 6/2004 | Baylis | |
| 2005/0139436 A1 | * | 6/2005 | Baumann | F16D 55/14 188/162 |

(Continued)

OTHER PUBLICATIONS

International Search Report and Written Opinion for International Application No. PCT/US2021/025488, dated Jul. 9, 2021, 9 pages.

*Primary Examiner* — Nicholas J Lane

(74) *Attorney, Agent, or Firm* — GREENBERG TRAURIG, LLP

(57) ABSTRACT

A braking system includes a rotor, a braking mechanism including a brake pad, and an actuator system configured to reposition the rotor from a first position where the rotor does not engage with the brake pad to a second position where the rotor engages with the brake pad.

20 Claims, 10 Drawing Sheets

(56) References Cited

U.S. PATENT DOCUMENTS

| | | | |
|---|---|---|---|
| 2010/0147123 A1* | 6/2010 | Baumann | F16D 55/04 83/58 |
| 2015/0114768 A1* | 4/2015 | Doleschel | F16D 55/40 188/72.3 |
| 2016/0160949 A1 | 6/2016 | Philpott | |

* cited by examiner

EXPANDING ROTOR BRAKE

CROSS-REFERENCE TO RELATED APPLICATIONS

This application is a continuation of International Patent Application No. PCT/US2021/025488, filed Apr. 2, 2021, which claims the benefit of and priority to U.S. Provisional Patent Application No. 63/005,366, filed Apr. 5, 2020, both of which are incorporated herein by reference in their entireties.

BACKGROUND

Vehicles include brakes to slow and stop the vehicles. Such brakes have traditionally included drum brakes or disc brakes. A drum brake includes a brake mechanism positioned inside of a rotating drum where the brake mechanism expands to engage with the drum to slow rotation thereof. A disc brake includes a rotor that rotates and a brake caliper that clamps down on the rotor to slow rotation thereof.

SUMMARY

One embodiment relates to a braking system for a vehicle. The braking system includes a rotor, a braking mechanism including a brake pad, and an actuator system configured to reposition the rotor from a first position where the rotor does not engage with the brake pad to a second position where the rotor engages with the brake pad.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a braking assembly coupled to an axle of a vehicle or machine includes (i) a dual rotor assembly having first rotor and a second rotor and (ii) a brake caliper having a first brake pad and a second brake pad. At least one of the first rotor or the second rotor is repositionable along the axle. In some embodiments, both of the first rotor and the second rotor is repositionable along the axle. During a braking event, the first rotor and/or the second rotor are repositioned to engage with the first brake pad and the second brake pad. In some embodiments, the first brake pad and/or the second brake pad are also repositionable is an opposing direction of the first rotor and the second rotor such that the first brake pad and the second brake pad further compress against the first rotor and the second rotor during the braking event. Such opposing movement of and engagement between the rotors and the brake pads may increase the braking forces applied by the braking assembly relative to traditional braking systems and provide improved stopping capabilities. In an alternative embodiment, the braking assembly includes a single, translatable rotor and a brake caliper with a single brake pad.

Overall Vehicle

Figure 1:
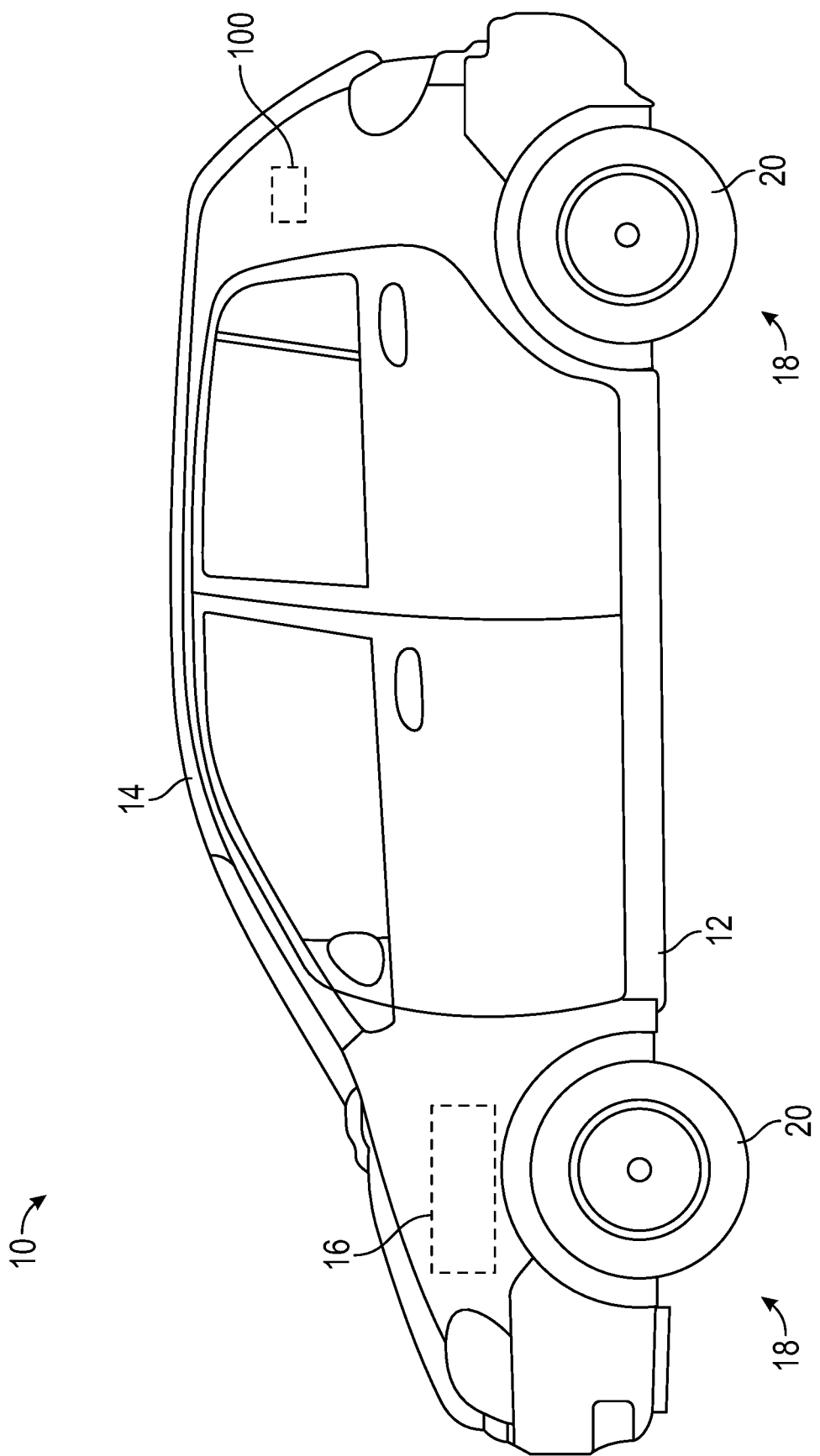
FIG. 1 is a side view of a vehicle, according to an exemplary embodiment.

According to the exemplary embodiment shown in FIG. 1, a machine, shown as vehicle 10, is configured as an on-road vehicle. By way of example, the on-road vehicle may be a passenger vehicle such as a sedan, a sport utility vehicle ("SUV"), a pickup truck, a van, and/or still another type of passenger vehicle. In other embodiments, the vehicle 10 is configured as another type of on-road vehicle such as a semi-truck, a bus, a tram, a trolley, or the like. In still other embodiments, the vehicle 10 is configured as an off-road vehicle or machine such as construction machinery, farming machinery, a train, a go-kart, an all-terrain vehicle ("ATV"), a utility task vehicle ("UTV"), or the like.

As shown in FIG. 1, the vehicle 10 includes a chassis, shown as frame 12, that supports a body assembly (e.g., hood, cab, trunk, doors, etc.), shown as body 14, a primary driver, shown as prime mover 16, and a plurality of axle assemblies, shown as axle assemblies 18, that facilitate coupling tractive elements, shown as wheel and tire assemblies 20, to the vehicle 10. In an alternative embodiment, the wheel and tire assemblies 20 are replaced with track assemblies.

The prime mover 16 is configured to provide a mechanical output to one or more of the axle assemblies 18 to propel the vehicle 10. In one embodiment, the vehicle 10 has a traditional drivetrain such that the prime mover 16 is an internal combustion engine (e.g., a compression-ignition engine, a spark-ignition engine, etc.) that utilizes fuel (e.g., diesel, gasoline, natural gas, propane, etc.). In another embodiment, the vehicle 10 has an electric drivetrain such that the prime mover 16 is an electric motor that utilizes electricity (e.g., from batteries on-board the vehicle 10, from overhead power lines, etc.). In still another embodiment, the vehicle 10 has a hybrid drivetrain such that the prime mover 16 is or includes an engine and a motor, a generator and a motor, and/or still another hybrid configuration. According to the exemplary embodiment shown in FIG. 1, the prime mover 16 is coupled to the frame 12 at a position at a front end of the vehicle 10 beneath the hood of the body 14 (i.e., a front engine or motor vehicle). In other embodiments, the prime mover 16 is otherwise positioned. By way of example, the prime mover 16 may be positioned at a read end of the frame 12 (i.e., a rear engine or motor vehicle). By way of example, the prime mover 16 may be positioned between the front end and the read end of the frame 12 (i.e., a mid-engine or motor vehicle). In some embodiments, the vehicle 10 includes a plurality of prime movers 16 (e.g., one for each of the axles assemblies, etc.).

According to the exemplary embodiment shown in FIG. 1, the axle assemblies 18 of the vehicle 10 includes a first or front axle assembly and a second or rear axle assembly. In one embodiment, only one of the front axle assembly or the rear axle assembly is driven by the prime mover 16 (e.g., a rear-wheel-drive, a front-wheel drive vehicle, etc.). In another embodiment, the front axle assembly and the rear axle assembly are both driven by the prime mover 16 (e.g., an all-wheel-drive vehicle, a four-wheel-drive vehicle, etc.). In one embodiment, the front axle assembly is a steerable axle assembly and the rear axle assembly is a non-steerable axle assembly. In another embodiment, the front axle assembly and the rear axle assembly are steerable axle assemblies. In some embodiments, the vehicle 10 includes a plurality of rear axle assemblies. In some embodiments, the vehicle 10 includes a plurality of front axle assemblies.

Axle and Brake Assembly

According to the exemplary embodiment shown in FIGS. 2-17, the axle assembly 18 includes (i) an axle shaft, shown as axle 30, that is configured to be coupled to the frame 12, (ii) a hub, shown as wheel hub 40, positioned at a free end of the axle 30 and that is configured to support one of the wheel and tire assemblies 20, and (iii) a braking system, shown as braking assembly 50. In some embodiments, the axle 30 has a solid axle structure that extends from one side of the vehicle 10 to the other side with a wheel hub 40 and braking assembly 50 positioned at opposing ends thereof. In some embodiments, the axle 30 has a half-shaft structure that has only one wheel hub 40 and braking assembly 50 coupled thereto. According to an exemplary embodiment, the braking assembly 50 is configured to provide increased braking forces to the axle 30 to provide improved stopping capabilities to the vehicle 10 relative to traditional drum brake systems or traditional disc brake systems.

Dual Rotor Assembly

As shown in FIGS. 2-15, the braking assembly 50 includes a dual rotor assembly having (i) a first rotor, shown as outer rotor 60, coupled to the axle 30 and positioned proximate the wheel hub 40 and (ii) a second rotor, shown as inner rotor 70, coupled to the axle 30 and spaced a distance from the outer rotor 60 such that a gap is defined between interior facing surfaces of the outer rotor 60 and the inner rotor 70. According to an exemplary embodiment, the outer rotor 60 and the inner rotor 70 are configured to rotate with the axle 30, the wheel hub 40, and the wheel and tire assembly 20 coupled to the wheel hub 40. According to an exemplary embodiment and as described in greater detail herein, at least one of the outer rotor 60 or the inner rotor 70 is selectively repositionable along the axle 30 to facilitate increasing and decreasing the size of the gap between the outer rotor 60 and the inner rotor 70. In some embodiments, both of the outer rotor 60 and the inner rotor 70 are selectively repositionable along the axle 30. In some embodiments, one of the outer rotor 60 or the inner rotor 70 is selectively repositionable along the axle 30 and the other one of the outer rotor 60 or the inner rotor 70 is in a fixed position along the axle 30. In some embodiments (e.g., in embodiment where the outer rotor 60 is fixed, etc.), the outer rotor 60 and the wheel hub 40 may be integrated into a single component. In some embodiment, neither the outer rotor 60 nor the inner rotor 70 is repositionable along the axle 30, but rather both are fixed.

As shown in FIGS. 2-15, the braking assembly 50 includes a braking mechanism, shown as brake caliper 80, including at least one first brake pad, shown as outer brake pad 82, and at least one second brake pad, shown as inner brake pad 84. According to an example embodiment, the brake caliper 80 is rotationally fixed such that the outer rotor 60 and the inner rotor 70 of the dual rotor assembly rotate relative to the brake caliper 80. In some embodiments, the braking assembly 50 includes a plurality of the brake calipers 80 (e.g., two, three, four, etc.) positioned about a single dual rotor assembly. According to the exemplary embodiment shown in FIGS. 2-15, the brake caliper 80 is configured as a single caliper unit that spans both the outer rotor 60 and the inner rotor 70. In another embodiment, the brake caliper 80 is configured as a dual caliper unit having (i) a first or outer caliper including the outer brake pad(s) 82 and that is associated with the outer rotor 60 and (ii) a second or inner caliper including the inner brake pad(s) 84 and that is associated with the inner rotor 70.

According to an exemplary embodiment, the brake caliper 80 includes an actuator or brake piston that is actuatable to reposition at least one of the outer brake pad(s) 82 or the inner brake pad(s) 84. In one embodiment, the brake piston is a hydraulic actuator that is hydraulically actuated. In another embodiment, the brake piston is a pneumatic actuator that is pneumatically actuated. In still another embodiment, the brake piston is an electric actuator that is electrically actuated. In one embodiment, the outer brake pad 82 and the inner brake pad 84 are actuated to compress inward toward each other and against exterior facing surfaces of the outer rotor 60 and the inner rotor 70, respectively. In another embodiment, the outer brake pad 82 and the inner brake pad 84 are actuated to expand outward from each other and against interior facing surfaces of the outer rotor 60 and the inner rotor 70, respectively. In still another embodiment, the outer brake pad 82 and the inner brake pad 84 move in the same direction and engage the outer rotor 60 and the inner rotor 70 (e.g., the exterior facing surface of the outer rotor 60 and the interior facing surface of the inner rotor 70, the interior facing surface of the outer rotor 60 and the exterior facing surface of the inner rotor 70, etc.). In yet another embodiment, one of the outer brake pad 82 or the inner brake pad 84 is repositionable, and the position of the other one of the outer brake pad 82 or the inner brake pad 84 is fixed. In yet another embodiment, the position of both the outer brake pad 82 and the inner brake pad 84 is fixed. In yet another embodiment, the brake caliper 80 includes a pair of outer brake pads 82 and a pair of inner brake pads 84.

As shown in FIGS. 2-13, the braking assembly 50 includes an actuator system, shown as rotor actuator system 90. According to an exemplary embodiment, the rotor actuator system 90 is configured to (i) reposition the outer rotor 60 between (a) a first position (e.g., a disengaged positioned, a non-braking position, etc.) where the outer rotor 60 is spaced from the outer brake pad 82 and (b) a second position (e.g., an engaged position, a braking position, etc.) where a surface (e.g., an exterior facing surface, an interior facing surface, etc.) of the outer rotor 60 engages with the outer brake pad 82 and/or (ii) reposition the inner rotor 70 between (a) a third position (e.g., a disengaged positioned, a non-braking position, etc.) where the inner rotor 70 is spaced from the inner brake pad 84 and (b) a fourth position (e.g., an engaged position, a braking position, etc.) where a surface (e.g., an exterior facing surface, an interior facing surface, etc.) of the inner rotor 70 engages with the inner brake pad 84.

According to an exemplary embodiment, the rotor actuator system 90 includes one or more actuators configured to (i) reposition the outer rotor 60 between the first position and the second position and/or (ii) reposition the inner rotor 70 between the third position and the fourth position. By way of example, the rotor actuator system 90 may include (i) a first actuator configured to reposition the outer rotor 60 between the first position and the second position and (ii) a second actuator configured to reposition the inner rotor 70 between the third position and the fourth position. By way of another example, the rotor actuator system 90 may include a single actuator configured to reposition both of (i) the outer rotor 60 between the first position and the second position and (ii) the inner rotor 70 between the third position and the fourth position. By way of yet another example, the rotor actuator system 90 may include a single actuator configured to reposition only one of (i) the outer rotor 60 between the first position and the second position or (ii) the inner rotor 70 between the third position and the fourth position (e.g., in embodiments where the position of one of the outer rotor 60 or the inner rotor 70 is fixed, etc.). In one embodiment, the one or more actuators are hydraulically operated actuators. In another embodiment, the one or more actuators are pneumatically operated actuators. In still another embodiment, the one or more actuators are electrically operated actuators.

In some embodiments, the rotor actuator system 90 includes one or more biasing elements (e.g., springs, resilient members, etc.) positioned to (i) bias the outer rotor 60 into the first position or the second position and/or (ii) bias the inner rotor 70 into the third position or the fourth position. By way of example, the rotor actuator system 90 may include (i) one or more first biasing elements positioned to bias the outer rotor 60 toward engagement with the outer brake pad 82 and/or (ii) one or more second biasing elements positioned to bias the inner rotor 70 toward engagement with the inner brake pad 84. By way of another example, the rotor actuator system 90 may include (i) one or more first biasing elements positioned to bias the outer rotor 60 away from engagement with the outer brake pad 82 and/or (ii) one or more second biasing elements positioned to bias the inner rotor 70 away from engagement with the inner brake pad 84. By way of still another example, the rotor actuator system 90 may include one or more biasing elements positioned to bias the outer rotor 60 and the inner rotor 70 away from each other and toward engagement with the outer brake pad 82 and the inner brake pad 84, respectively. By way of still another example, the rotor actuator system 90 may include one or more biasing elements positioned to bias the outer rotor 60 and the inner rotor 70 away from each other and away from engagement with the outer brake pad 82 and the inner brake pad 84, respectively.

In some embodiments, the rotor actuator system 90 includes a track system that couples the outer rotor 60 and/or the inner rotor 70 to the axle 30. The track system is configured to permit sliding movement of (i) the outer rotor 60 between the first position and the second position and/or (ii) the inner rotor 70 between the third position and the fourth position. In some embodiments, the track system includes a locking mechanism (e.g., the rotor locking mechanism 130, etc.) that holds or locks the outer rotor 60 in the first position and/or the inner rotor 70 in the third position until a braking condition is present to prevent engagement with the brake caliper 80 absent the braking condition.

First Dual Rotor Assembly Design

Figure 2:
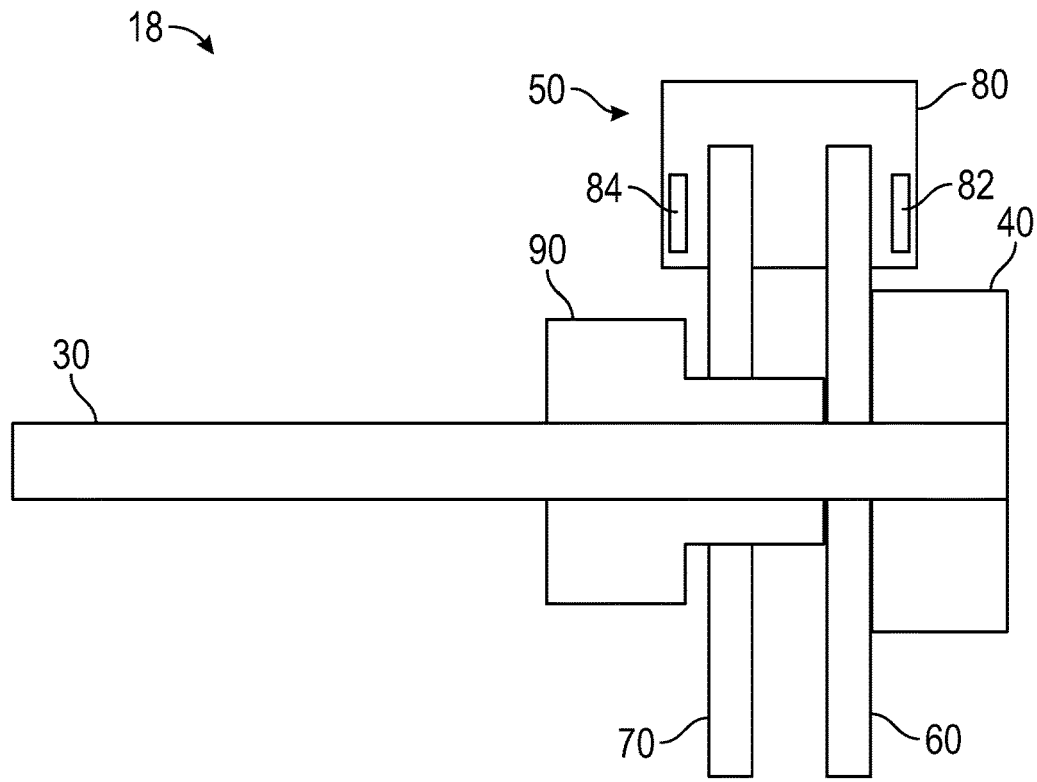
FIG. 2 is a cross-sectional view of an axle and brake assembly of the vehicle of FIG. 1 with the brake assembly in a first, non-braking configuration, according to an exemplary embodiment.
Figure 3:
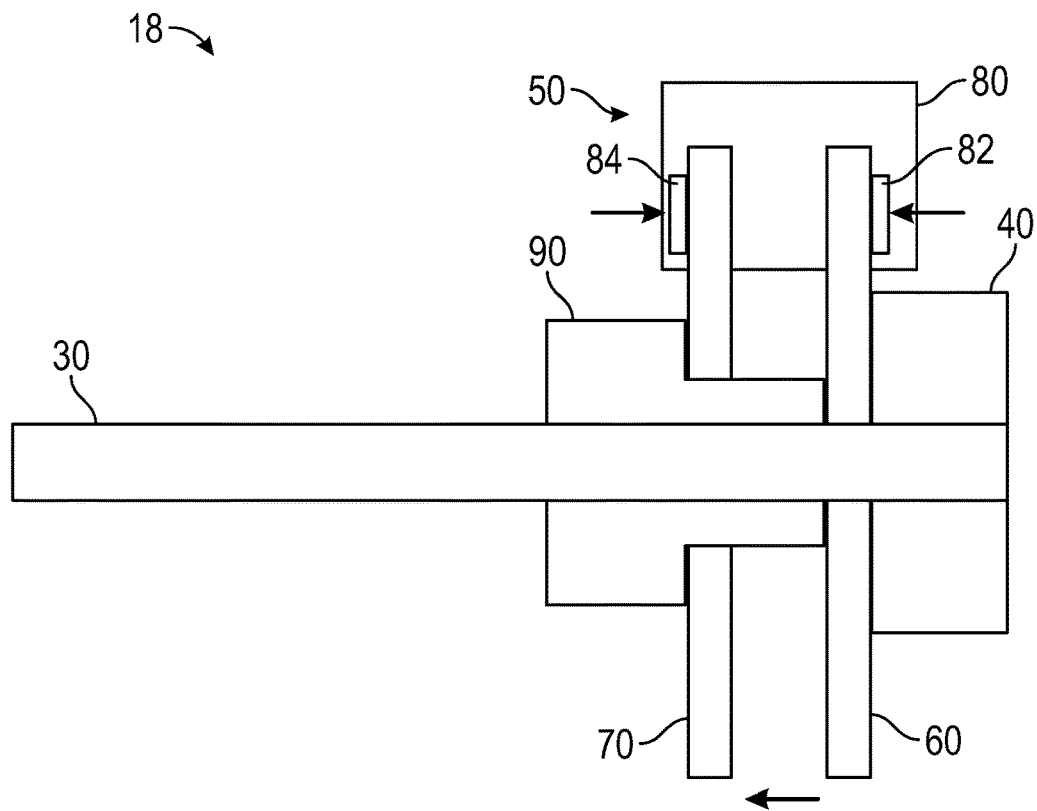
FIG. 3 is a cross-sectional view of the axle and brake assembly of FIG. 2 with the brake assembly in a second, braking configuration, according to an exemplary embodiment.

According to the exemplary embodiment shown in FIGS. 2 and 3, the outer rotor 60 is fixed along the axle 30 and the inner rotor 70 is translatable along the axle 30 (i.e., between the third position and the fourth position). In some embodiments, the outer rotor 60 and the wheel hub 40 are integrally formed. In some embodiments, the outer rotor 60 is separate from the wheel hub 40 and spaced therefrom. In an alternative embodiment, the inner rotor 70 is fixed and the outer rotor 60 is translatable along the axle 30 (i.e., between the first position and the second position).

As shown in FIGS. 2 and 3, the brake caliper 80 is arranged such that the outer brake pad 82 and the inner brake pad 84 are positioned on the outside of the outer rotor 60 and the inner rotor 70, proximate exterior facing surfaces thereof. The rotor actuator system 90 is configured to facilitate repositioning the inner rotor 70 from the third position or disengaged position (as shown in FIG. 2) to the fourth position or engaged position (as shown in FIG. 3) to translate the inner rotor 70 away from the outer rotor 60 to increase the size of the gap between the outer rotor 60 and the inner rotor 70 when a braking condition is present (e.g., an operator of the vehicle 10 pressing a brake pedal, auto-braking by a control system, etc.).

When the rotor actuator system 90 repositions the inner rotor 70 to the fourth position, the brake caliper 80 may be simultaneously engaged such that at least the outer brake pad 82 is compressed against an exterior facing surface of the outer rotor 60 by the brake piston. In some embodiments, the inner brake pad 84 is fixed and an exterior facing surface of the inner rotor 70 engages with the inner brake pad 84 when the inner rotor 70 is translated to the fourth position by the rotor actuator system 90. In some embodiments, the outer brake pad 82 and the inner brake pad 84 are both repositionable toward each other and compress against the exterior facing surfaces of the outer rotor 60 and the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes an actuator that is configured to (i) reposition the inner rotor 70 into the third position when a braking condition is not present and (ii) reposition the inner rotor 70 into the fourth position when the braking condition is present.

In another embodiment, the rotor actuator system 90 includes the actuator and one or more biasing elements positioned between the outer rotor 60 and the inner rotor 70 to apply a biasing force to the interior facing surfaces of the outer rotor 60 and the inner rotor 70. The one or more biasing elements may, therefore, bias the inner rotor 70 into the fourth position and toward engagement with the inner brake pad 84. In such an embodiment, the actuator of the rotor actuator system 90 is configured to (i) apply an actuator force to the exterior facing surface of the inner rotor 70 to overcome the biasing force of the one or more biasing elements and force the inner rotor 70 into the third position when a braking condition is not present and (ii) reduce or release the actuator force when the braking condition is present such that the biasing force of the one or more biasing elements forces the inner rotor 70 into the fourth position.

In still another embodiment, the rotor actuator system 90 includes the actuator and one or more biasing elements positioned to apply a biasing force to the exterior facing surface of the inner rotor 70. The one or more biasing elements may, therefore, bias the inner rotor 70 into the third position and away from engagement with the inner brake pad 84. In such an embodiment, the actuator of the rotor actuator system 90 is configured to (i) apply an actuator force to the interior facing surface of the inner rotor 70 to overcome the biasing force of the one or more biasing elements and force the inner rotor 70 into the fourth position when a braking condition is present and (ii) reduce or release the actuator force when the braking condition is not present such that the biasing force of the one or more biasing elements forces the inner rotor 70 into the third position.

Second Dual Rotor Assembly Design

Figure 4:
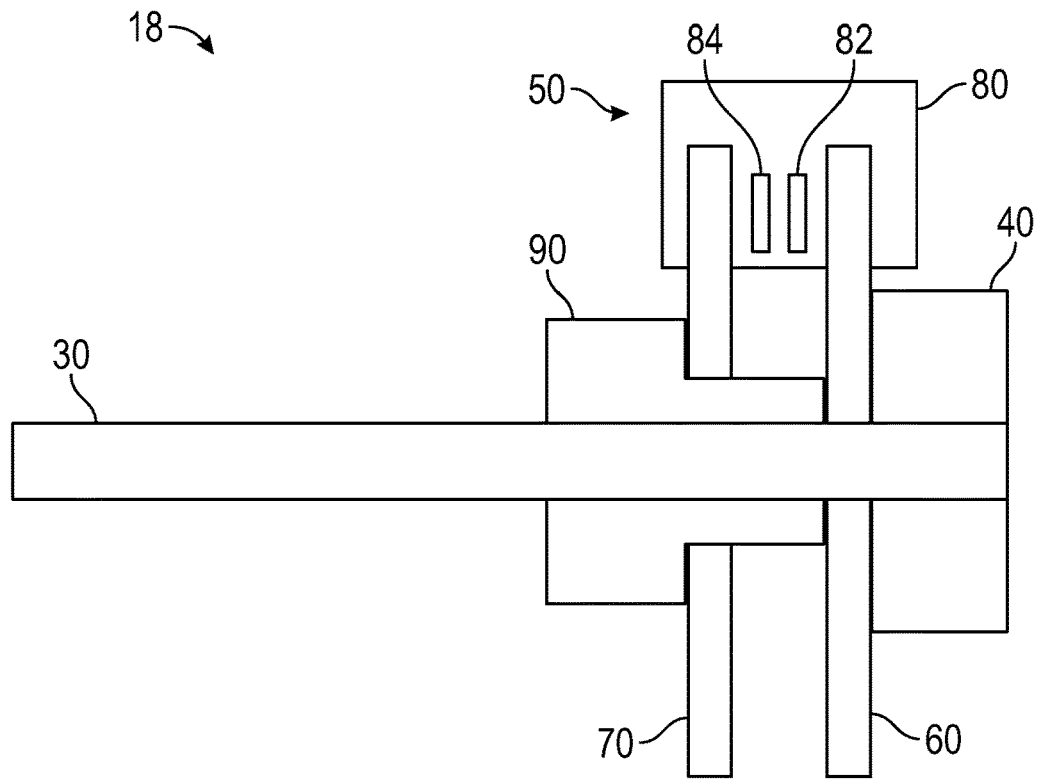
FIG. 4 is a cross-sectional view of an axle and brake assembly of the vehicle of FIG. 1 with the brake assembly in a first, non-braking configuration, according to another exemplary embodiment.
Figure 5:
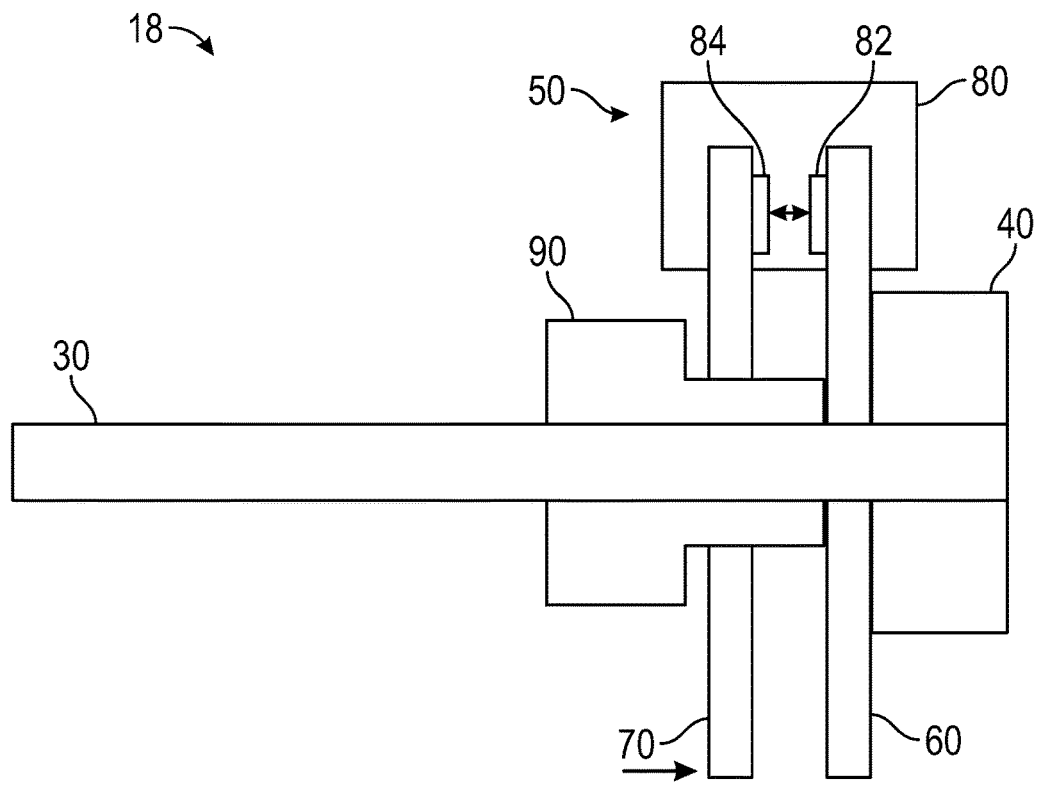
FIG. 5 is a cross-sectional view of the axle and brake assembly of FIG. 4 with the brake assembly in a second, braking configuration, according to an exemplary embodiment.

According to the exemplary embodiment shown in FIGS. 4 and 5, the outer rotor 60 is fixed along the axle 30 and the inner rotor 70 is translatable along the axle 30 (i.e., between the third position and the fourth position). In some embodiments, the outer rotor 60 and the wheel hub 40 are integrally formed. In some embodiments, the outer rotor 60 is separate from the wheel hub 40 and spaced therefrom. In an alternative embodiment, the inner rotor 70 is fixed and the outer rotor 60 is translatable along the axle 30 (i.e., between the first position and the second position).

As shown in FIGS. 4 and 5, the brake caliper 80 is arranged such that the outer brake pad 82 and the inner brake pad 84 are positioned between the outer rotor 60 and the inner rotor 70, proximate interior facing surfaces thereof. The rotor actuator system 90 is configured to facilitate repositioning the inner rotor 70 from the third position or disengaged position (as shown in FIG. 4) to the fourth position or engaged position (as shown in FIG. 5) to translate the inner rotor 70 toward the outer rotor 60 to decrease the size of the gap between the outer rotor 60 and the inner rotor 70 when a braking condition is present (e.g., an operator of the vehicle 10 pressing a brake pedal, auto-braking by a control system, etc.).

When the rotor actuator system 90 repositions the inner rotor 70 to the fourth position, the brake caliper 80 may be simultaneously engaged such that at least the outer brake pad 82 is compressed against an interior facing surface of the outer rotor 60 by the brake piston. In some embodiments, the inner brake pad 84 is fixed and an interior facing surface of the inner rotor 70 engages with the inner brake pad 84 when the inner rotor 70 is translated to the fourth position by the rotor actuator system 90. In some embodiments, the outer brake pad 82 and the inner brake pad 84 are both repositionable away from each other and compress against the interior facing surfaces of the outer rotor 60 and the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes an actuator that is configured to (i) reposition the inner rotor 70 into the third position when a braking condition is not present and (ii) reposition the inner rotor 70 into the fourth position when the braking condition is present.

In another embodiment, the rotor actuator system 90 includes the actuator and one or more biasing elements positioned between the outer rotor 60 and the inner rotor 70 to apply a biasing force to the interior facing surfaces of the outer rotor 60 and the inner rotor 70. The one or more biasing elements may, therefore, bias the inner rotor 70 into the third position and away from engagement with the inner brake pad 84. In such an embodiment, the actuator of the rotor actuator system 90 is configured to (i) apply an actuator force to the exterior facing surface of the inner rotor 70 to overcome the biasing force of the one or more biasing elements and force the inner rotor 70 into the fourth position when a braking condition is present and (ii) reduce or release the actuator force when the braking condition is not present such that the biasing force of the one or more biasing elements forces the inner rotor 70 into the third position.

In still another embodiment, the rotor actuator system 90 includes the actuator and one or more biasing elements positioned to apply a biasing force to the exterior facing surface of the inner rotor 70. The one or more biasing elements may, therefore, bias the inner rotor 70 into the fourth position and toward engagement with the inner brake pad 84. In such an embodiment, the actuator of the rotor actuator system 90 is configured to (i) apply an actuator force to the interior facing surface of the inner rotor 70 to overcome the biasing force of the one or more biasing elements and force the inner rotor 70 into the third position when a braking condition is not present and (ii) reduce or release the actuator force when the braking condition is present such that the biasing force of the one or more biasing elements forces the inner rotor 70 into the fourth position.

Third Dual Rotor Assembly Design

Figure 6:
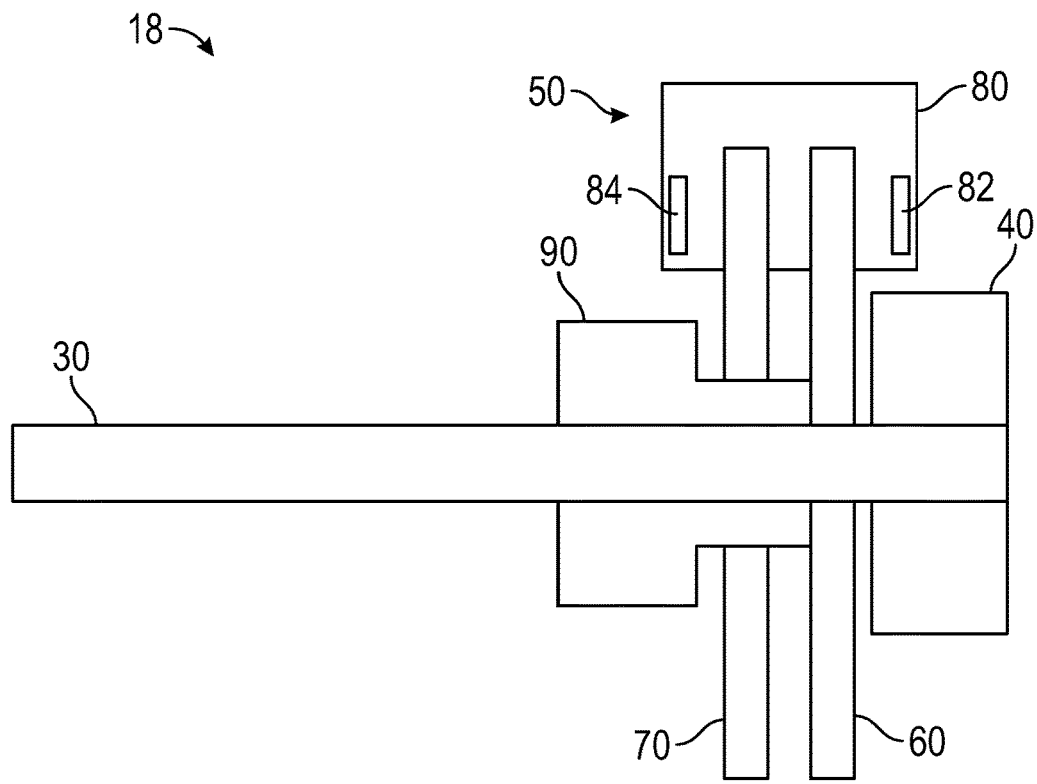
FIG. 6 is a cross-sectional view of an axle and brake assembly of the vehicle of FIG. 1 with the brake assembly in a first, non-braking configuration, according to another exemplary embodiment.
Figure 7:
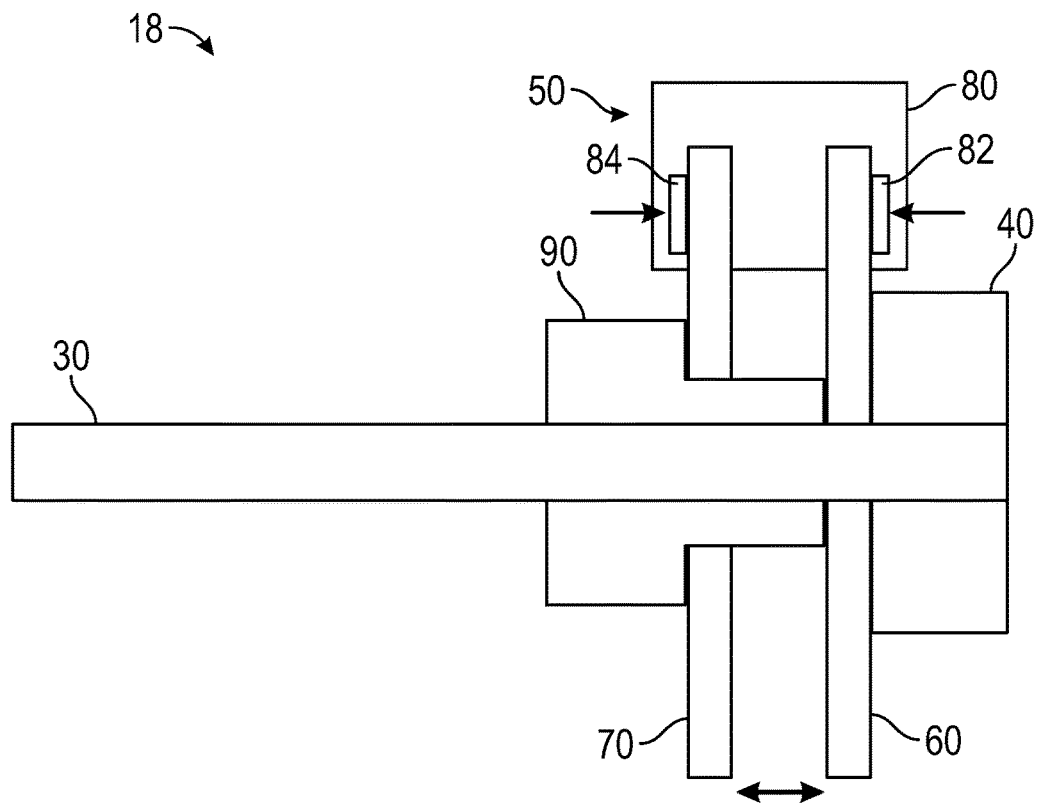
FIG. 7 is a cross-sectional view of the axle and brake assembly of FIG. 6 with the brake assembly in a second, braking configuration, according to an exemplary embodiment.

According to the exemplary embodiment shown in FIGS. 6 and 7, the outer rotor 60 is translatable along the axle 30 (i.e., between the first position and the second position) and the inner rotor 70 is translatable along the axle 30 (i.e., between the third position and the fourth position). As shown in FIGS. 6 and 7, the brake caliper 80 is arranged such that the outer brake pad 82 and the inner brake pad 84 are positioned on the outside of the outer rotor 60 and the inner rotor 70, proximate exterior facing surfaces thereof. The rotor actuator system 90 is configured to facilitate repositioning (i) the outer rotor 60 from the first position or disengaged position (as shown in FIG. 6) to the second position or engaged position (as shown in FIG. 7) and (ii) the inner rotor 70 from the third position or disengaged position (as shown in FIG. 6) to the fourth position or engaged position (as shown in FIG. 7) to translate the outer rotor 60 and the inner rotor 70 away from each other to increase the size of the gap between the outer rotor 60 and the inner rotor 70 when a braking condition is present (e.g., an operator of the vehicle 10 pressing a brake pedal, auto-braking by a control system, etc.).

In some embodiments, the outer brake pad 82 and the inner brake pad 84 are fixed. In such embodiments, when the rotor actuator system 90 repositions the outer rotor 60 to the second position and the inner rotor 70 to the fourth position, exterior facing surfaces of the outer rotor 60 and the inner rotor 70 engage with the outer brake pad 82 and the inner brake pad 84, respectively. In some embodiments, the outer brake pad 82 and the inner brake pad 84 are repositionable toward each other and compress against the exterior facing surfaces of the outer rotor 60 and the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes (i) a first actuator that is configured to (a) reposition the outer rotor 60 into the first position when a braking condition is not present and/or (b) reposition the outer rotor 60 into the second position when the braking condition is present and (ii) a second actuator that is configured to (a) reposition the inner rotor 70 into the third position when a braking condition is not present and/or (b) reposition the inner rotor 70 into the fourth position when the braking condition is present. In another embodiment, the rotor actuator system 90 includes a single actuator that is configured to (i) reposition the outer rotor 60 into the first position and the inner rotor 70 into the third position when a braking condition is not present and/or (b) reposition the outer rotor 60 into the second position and the inner rotor 70 into the fourth position when the braking condition is present.

In some embodiments, the rotor actuator system 90 includes one or more biasing elements positioned between the outer rotor 60 and the inner rotor 70 to apply a biasing force to the interior facing surfaces of the outer rotor 60 and the inner rotor 70. The one or more biasing elements may, therefore, bias (i) the outer rotor 60 into the second position and toward engagement with the outer brake pad 82 and (ii) the inner rotor 70 into the fourth position and toward engagement with the inner brake pad 84. In such embodiments, the actuator(s) (e.g., the single actuator, the first actuator and the second actuator, etc.) of the rotor actuator system 90 is/are configured to (i) apply an actuator force to the exterior facing surfaces of the outer rotor 60 and the inner rotor 70 to overcome the biasing force of the one or more biasing elements and force the outer rotor 60 into the first position and the inner rotor 70 into the third position when a braking condition is not present and (ii) reduce or release the actuator force when the braking condition is present such that the biasing force of the one or more biasing elements forces the outer rotor 60 into the second position and the inner rotor 70 into the fourth position.

In some embodiments, the rotor actuator system 90 includes (i) one or more first biasing elements positioned to apply a first biasing force to the exterior facing surface of the outer rotor 60 and/or (ii) one or more second biasing elements positioned to apply a second biasing force to the exterior facing surface of the inner rotor 70. The one or more first biasing elements may, therefore, bias the outer rotor 60 into the first position and away from engagement with the outer brake pad 82, and the one or more second biasing elements may, therefore, bias the inner rotor 70 into the third position and away from engagement with the inner brake pad 84. In such embodiments, the actuator(s) (e.g., the single actuator, the first actuator and the second actuator, etc.) of the rotor actuator system 90 is/are configured to (i) apply an actuator force to the interior facing surfaces of the outer rotor 60 and the inner rotor 70 to overcome the first biasing force of the one or more first biasing elements and the second biasing force of the one or more second biasing elements and force the outer rotor 60 into the second position and the inner rotor 70 into the fourth position when a braking condition is present and (ii) reduce or release the actuator force when the braking condition is not present such that the first biasing force of the one or more first biasing elements and the second biasing force of the one or more second biasing elements force the outer rotor 60 into the first position and the inner rotor 70 into the third position, respectively.

Fourth Dual Rotor Assembly Design

Figure 8:
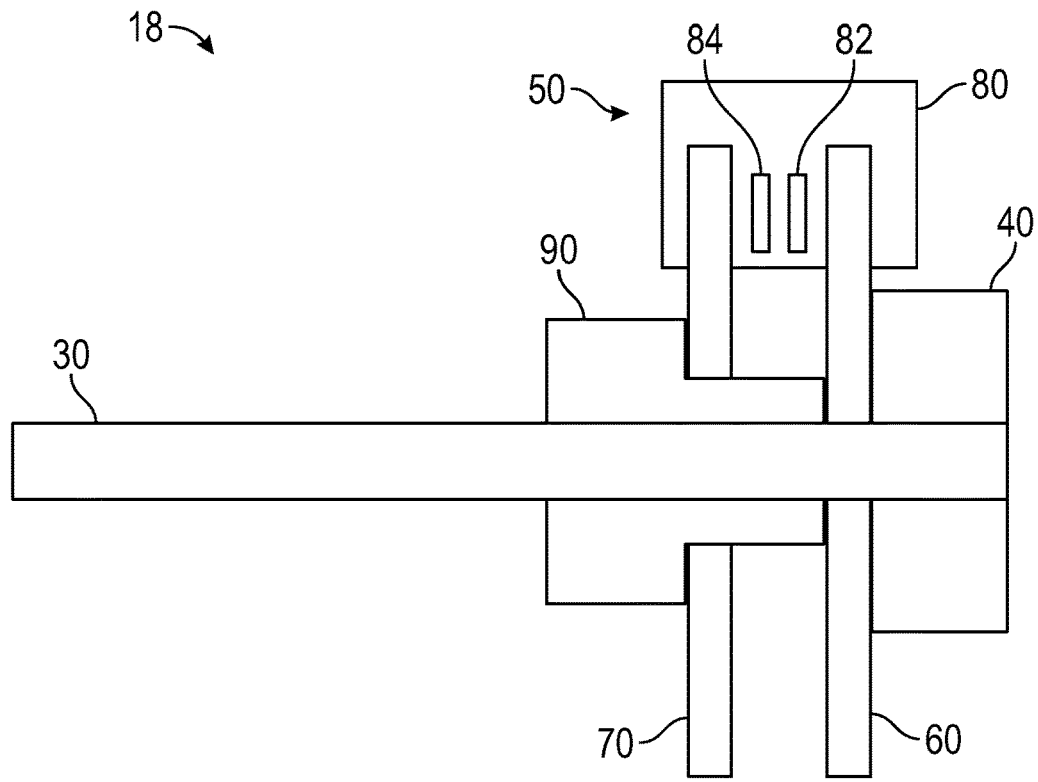
FIG. 8 is a cross-sectional view of an axle and brake assembly of the vehicle of FIG. 1 with the brake assembly in a first, non-braking configuration, according to another exemplary embodiment.
Figure 9:
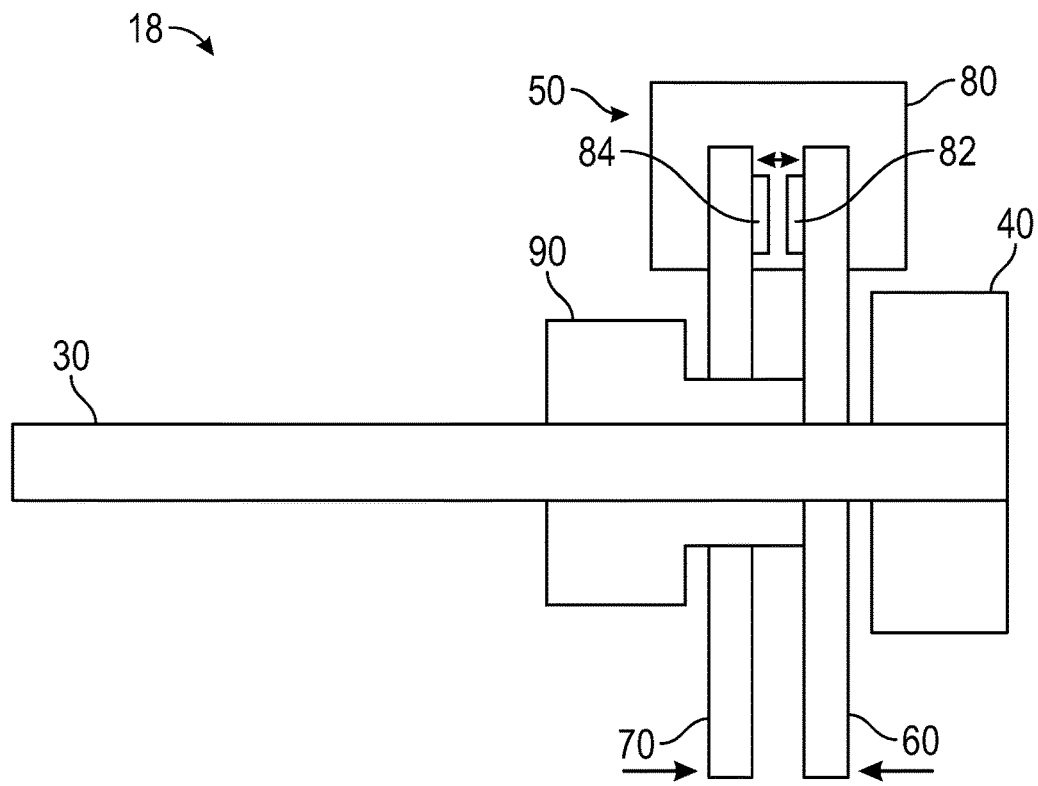
FIG. 9 is a cross-sectional view of the axle and brake assembly of FIG. 8 with the brake assembly in a second, braking configuration, according to an exemplary embodiment.

According to the exemplary embodiment shown in FIGS. 8 and 9, the outer rotor 60 is translatable along the axle 30 (i.e., between the first position and the second position) and the inner rotor 70 is translatable along the axle 30 (i.e., between the third position and the fourth position). As shown in FIGS. 8 and 9, the brake caliper 80 is arranged such that the outer brake pad 82 and the inner brake pad 84 are positioned between the outer rotor 60 and the inner rotor 70, proximate interior facing surfaces thereof. The rotor actuator system 90 is configured to facilitate repositioning (i) the outer rotor 60 from the first position or disengaged position (as shown in FIG. 8) to the second position or engaged position (as shown in FIG. 9) and (ii) the inner rotor 70 from the third position or disengaged position (as shown in FIG. 8) to the fourth position or engaged position (as shown in FIG. 9) to translate the outer rotor 60 and the inner rotor 70 toward each other to decrease the size of the gap between the outer rotor 60 and the inner rotor 70 when a braking condition is present (e.g., an operator of the vehicle 10 pressing a brake pedal, auto-braking by a control system, etc.).

In some embodiments, the outer brake pad 82 and the inner brake pad 84 are fixed. In such embodiments, when the rotor actuator system 90 repositions the outer rotor 60 to the second position and the inner rotor 70 to the fourth position, interior facing surfaces of the outer rotor 60 and the inner rotor 70 engage with the outer brake pad 82 and the inner brake pad 84, respectively. In some embodiments, the outer brake pad 82 and the inner brake pad 84 are repositionable away from each other and compress against the interior facing surfaces of the outer rotor 60 and the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes (i) a first actuator that is configured to (a) reposition the outer rotor 60 into the first position when a braking condition is not present and/or (b) reposition the outer rotor 60 into the second position when the braking condition is present and (ii) a second actuator that is configured to (a) reposition the inner rotor 70 into the third position when a braking condition is not present and/or (b) reposition the inner rotor 70 into the fourth position when the braking condition is present. In another embodiment, the rotor actuator system 90 includes a single actuator that is configured to (i) reposition the outer rotor 60 into the first position and the inner rotor 70 into the third position when a braking condition is not present and/or (b) reposition the outer rotor 60 into the second position and the inner rotor 70 into the fourth position when the braking condition is present.

In some embodiments, the rotor actuator system 90 includes one or more biasing elements positioned between the outer rotor 60 and the inner rotor 70 to apply a biasing force to the interior facing surfaces of the outer rotor 60 and the inner rotor 70. The one or more biasing elements may, therefore, bias (i) the outer rotor 60 into the first position and away from engagement with the outer brake pad 82 and (ii) the inner rotor 70 into the third position and away from engagement with the inner brake pad 84. In such embodiments, the actuator(s) (e.g., the single actuator, the first actuator and the second actuator, etc.) of the rotor actuator system 90 is/are configured to (i) apply an actuator force to the exterior facing surfaces of the outer rotor 60 and the inner rotor 70 to overcome the biasing force of the one or more biasing elements and force the outer rotor 60 into the second position and the inner rotor 70 into the fourth position when a braking condition is present and (ii) reduce or release the actuator force when the braking condition is not present such that the biasing force of the one or more biasing elements forces the outer rotor 60 into the first position and the inner rotor 70 into the third position.

In some embodiments, the rotor actuator system 90 includes (i) one or more first biasing elements positioned to apply a first biasing force to the exterior facing surface of the outer rotor 60 and/or (ii) one or more second biasing elements positioned to apply a second biasing force to the exterior facing surface of the inner rotor 70. The one or more first biasing elements may, therefore, bias the outer rotor 60 into the second position and toward engagement with the outer brake pad 82, and the one or more second biasing elements may, therefore, bias the inner rotor 70 into the fourth position and toward engagement with the inner brake pad 84. In such embodiments, the actuator(s) (e.g., the single actuator, the first actuator and the second actuator, etc.) of the rotor actuator system 90 is/are configured to (i) apply an actuator force to the interior facing surfaces of the outer rotor 60 and the inner rotor 70 to overcome the first biasing force of the one or more first biasing elements and the second biasing force of the one or more second biasing elements and force the outer rotor 60 into the first position and the inner rotor 70 into the third position when a braking condition is not present and (ii) reduce or release the actuator force when the braking condition is present such that the first biasing force of the one or more first biasing elements and the second biasing force of the one or more second biasing elements force the outer rotor 60 into the second position and the inner rotor 70 into the fourth position, respectively.

Fifth Dual Rotor Assembly Design

Figure 10:
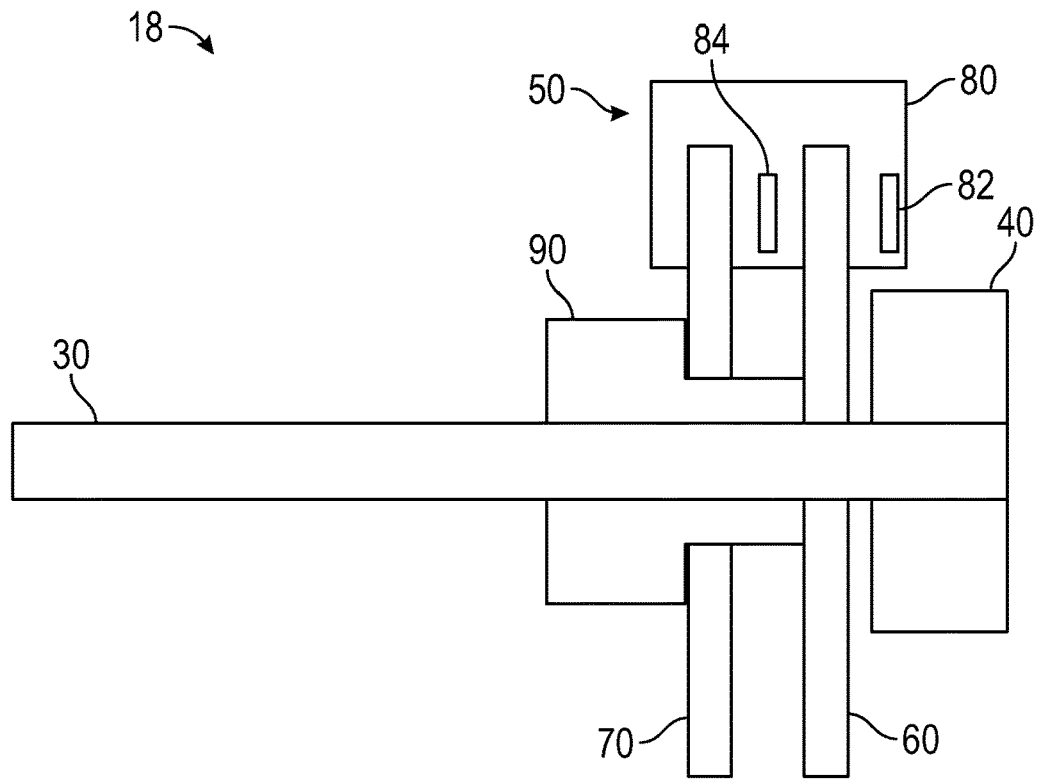
FIG. 10 is a cross-sectional view of an axle and brake assembly of the vehicle of FIG. 1 with the brake assembly in a first, non-braking configuration, according to another exemplary embodiment.
Figure 11:
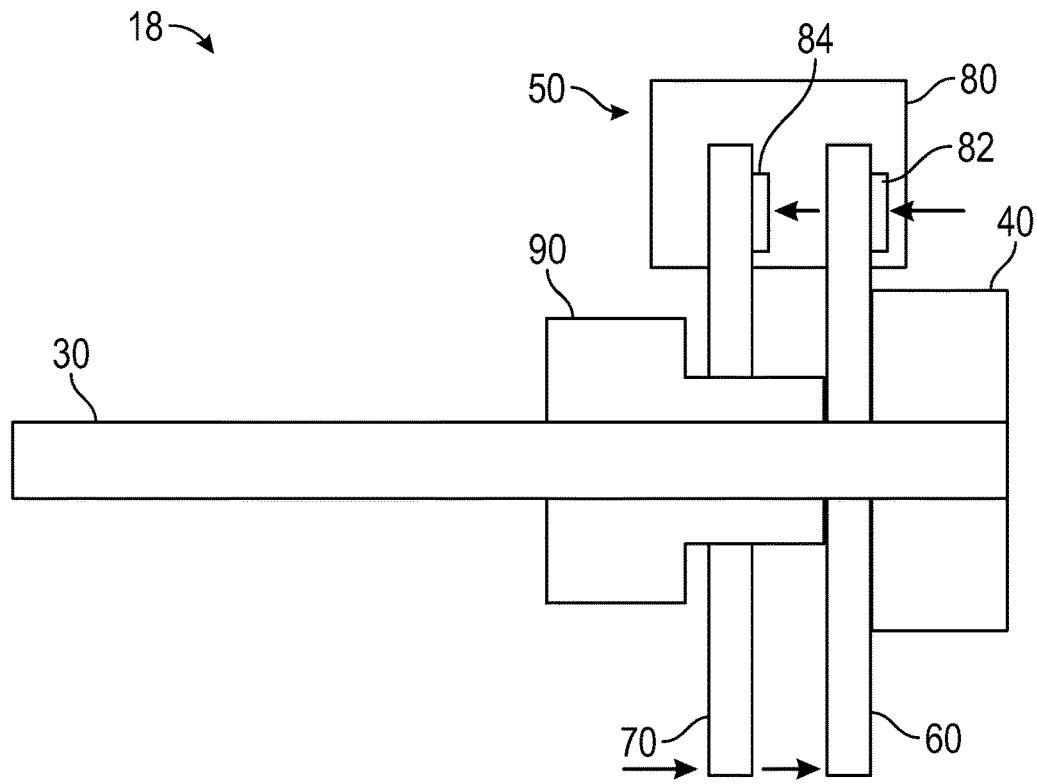
FIG. 11 is a cross-sectional view of the axle and brake assembly of FIG. 10 with the brake assembly in a second, braking configuration, according to an exemplary embodiment.

According to the exemplary embodiment shown in FIGS. 10 and 11, the outer rotor 60 is translatable along the axle 30 (i.e., between the first position and the second position) and the inner rotor 70 is translatable along the axle 30 (i.e., between the third position and the fourth position). As shown in FIGS. 10 and 11, the brake caliper 80 is arranged such that the outer brake pad 82 is positioned proximate the exterior facing surface of the outer rotor 60 and the inner brake pad 84 is positioned proximate the interior facing surface of the inner rotor 70. The rotor actuator system 90 is configured to facilitate repositioning (i) the outer rotor 60 from the first position or disengaged position (as shown in FIG. 10) to the second position or engaged position (as shown in FIG. 11) and (ii) the inner rotor 70 from the third position or disengaged position (as shown in FIG. 10) to the fourth position or engaged position (as shown in FIG. 11) by translating the outer rotor 60 and the inner rotor 70 in the same direction and outward towards the wheel hub 40 when a braking condition is present (e.g., an operator of the vehicle 10 pressing a brake pedal, auto-braking by a control system, etc.).

In some embodiments, the outer brake pad 82 and the inner brake pad 84 are fixed. In such embodiments, when the rotor actuator system 90 repositions the outer rotor 60 to the second position and the inner rotor 70 to the fourth position, the exterior facing surface of the outer rotor 60 and the interior facing surface of the inner rotor 70 engages with the outer brake pad 82 and the inner brake pad 84, respectively. In some embodiments, the outer brake pad 82 is repositionable toward the exterior facing surface of the outer rotor 60 and/or the inner brake pad 84 is repositionable toward the interior facing surface of the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes (i) a first actuator that is configured to (a) reposition the outer rotor 60 into the first position when a braking condition is not present and/or (b) reposition the outer rotor 60 into the second position when the braking condition is present and (ii) a second actuator that is configured to (a) reposition the inner rotor 70 into the third position when a braking condition is not present and/or (b) reposition the inner rotor 70 into the fourth position when the braking condition is present. In another embodiment, the rotor actuator system 90 includes a single actuator that is configured to (i) reposition the outer rotor 60 into the first position and the inner rotor 70 into the third position when a braking condition is not present and/or (b) reposition the outer rotor 60 into the second position and the inner rotor 70 into the fourth position when the braking condition is present.

In some embodiments, the rotor actuator system 90 includes (i) one or more first biasing elements positioned to apply a first biasing force to the exterior facing surface of the outer rotor 60 and/or (ii) one or more second biasing elements positioned to apply a second biasing force to the interior facing surface of the inner rotor 70. The one or more first biasing elements may, therefore, bias the outer rotor 60 into the first position and away from engagement with the outer brake pad 82, and the one or more second biasing elements may, therefore, bias the inner rotor 70 into the third position and away from engagement with the inner brake pad 84. In such embodiments, the actuator(s) (e.g., the single actuator, the first actuator and the second actuator, etc.) of the rotor actuator system 90 is/are configured to (i) apply an actuator force to the interior facing surface of the outer rotor 60 and the exterior facing surface of the inner rotor 70 to overcome the first biasing force of the one or more first biasing elements and the second biasing force of the one or more second biasing elements and force the outer rotor 60 into the second position and the inner rotor 70 into the fourth position when a braking condition is present and (ii) reduce or release the actuator force when the braking condition is not present such that the first biasing force of the one or more first biasing elements and the second biasing force of the one or more second biasing elements force the outer rotor 60 into the first position and the inner rotor 70 into the third position, respectively.

In some embodiments, the rotor actuator system 90 includes (i) one or more first biasing elements positioned to apply a first biasing force to the interior facing surface of the outer rotor 60 and/or (ii) one or more second biasing elements positioned to apply a second biasing force to the exterior facing surface of the inner rotor 70. The one or more first biasing elements may, therefore, bias the outer rotor 60 into the second position and toward engagement with the outer brake pad 82, and the one or more second biasing elements may, therefore, bias the inner rotor 70 into the fourth position and toward engagement with the inner brake pad 84. In such embodiments, the actuator(s) (e.g., the single actuator, the first actuator and the second actuator, etc.) of the rotor actuator system 90 is/are configured to (i) apply an actuator force to the exterior facing surface of the outer rotor 60 and the interior facing surface of the inner rotor 70 to overcome the first biasing force of the one or more first biasing elements and the second biasing force of the one or more second biasing elements and force the outer rotor 60 into the first position and the inner rotor 70 into the third position when a braking condition is not present and (ii) reduce or release the actuator force when the braking condition is present such that the first biasing force of the one or more first biasing elements and the second biasing force of the one or more second biasing elements force the outer rotor 60 into the second position and the inner rotor 70 into the fourth position, respectively.

Sixth Dual Rotor Assembly Design

Figure 12:
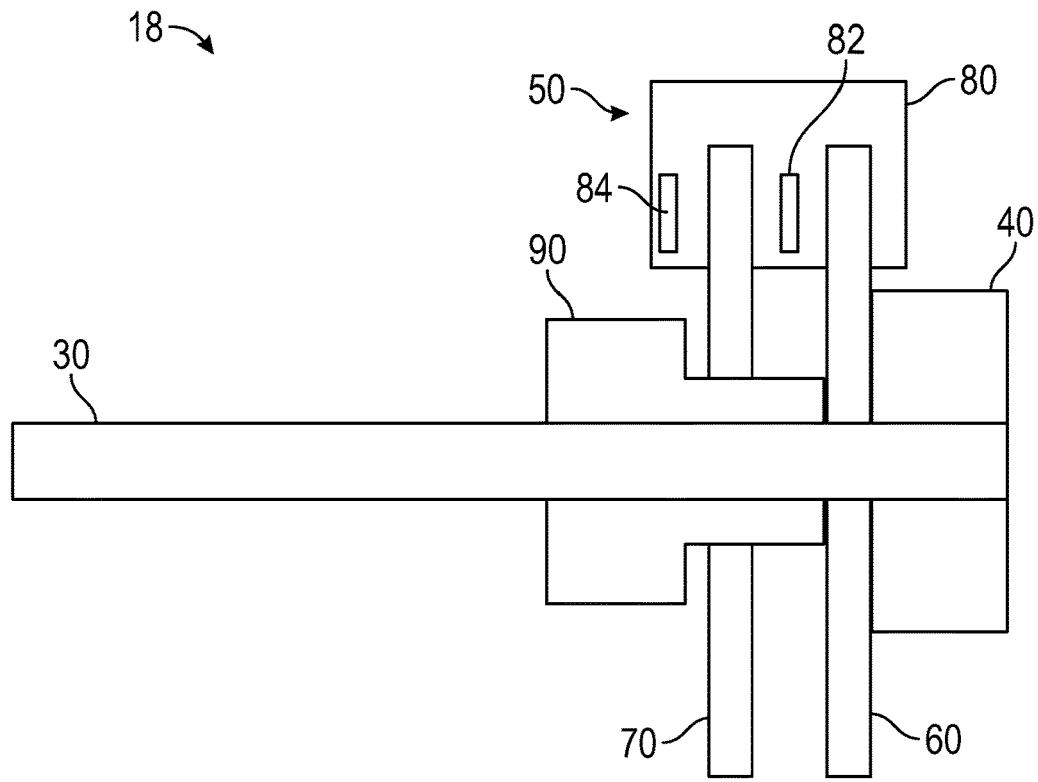
FIG. 12 is a cross-sectional view of an axle and brake assembly of the vehicle of FIG. 1 with the brake assembly in a first, non-braking configuration, according to another exemplary embodiment.
Figure 13:
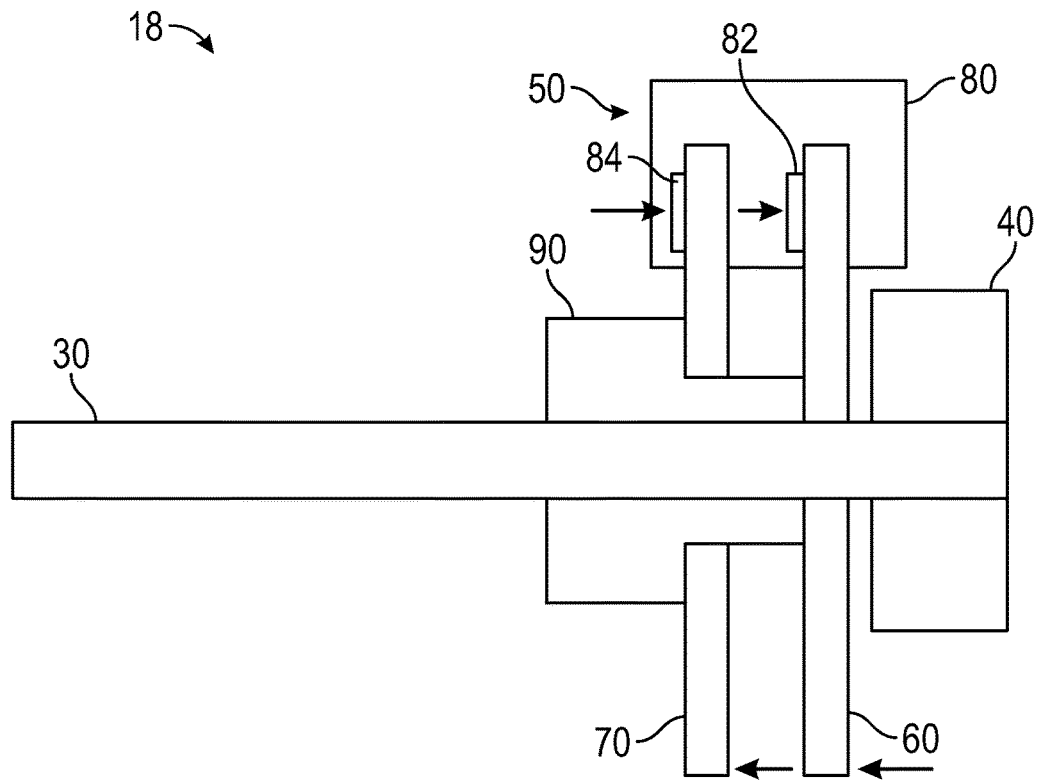
FIG. 13 is a cross-sectional view of the axle and brake assembly of FIG. 12 with the brake assembly in a second, braking configuration, according to an exemplary embodiment.

According to the exemplary embodiment shown in FIGS. 12 and 13, the outer rotor 60 is translatable along the axle 30 (i.e., between the first position and the second position) and the inner rotor 70 is translatable along the axle 30 (i.e., between the third position and the fourth position). As shown in FIGS. 12 and 13, the brake caliper 80 is arranged such that the outer brake pad 82 is positioned proximate the interior facing surface of the outer rotor 60 and the inner brake pad 84 is positioned proximate the exterior facing surface of the inner rotor 70. The rotor actuator system 90 is configured to facilitate repositioning (i) the outer rotor 60 from the first position or disengaged position (as shown in FIG. 12) to the second position or engaged position (as shown in FIG. 13) and (ii) the inner rotor 70 from the third position or disengaged position (as shown in FIG. 12) to the fourth position or engaged position (as shown in FIG. 13) by translating the outer rotor 60 and the inner rotor 70 in the same direction and inward away from the wheel hub 40 when a braking condition is present (e.g., an operator of the vehicle 10 pressing a brake pedal, auto-braking by a control system, etc.).

In some embodiments, the outer brake pad 82 and the inner brake pad 84 are fixed. In such embodiments, when the rotor actuator system 90 repositions the outer rotor 60 to the second position and the inner rotor 70 to the fourth position, the interior facing surface of the outer rotor 60 and the exterior facing surface of the inner rotor 70 engages with the outer brake pad 82 and the inner brake pad 84, respectively. In some embodiments, the outer brake pad 82 is repositionable toward the interior facing surface of the outer rotor 60 and/or the inner brake pad 84 is repositionable toward the exterior facing surface of the inner rotor 70, respectively, when the brake caliper 80 is engaged. The outer rotor 60, the inner rotor 70, the outer brake pad 82, and/or the inner brake pad 84 can be engaged together or separately (e.g., to provide varied levels of braking, etc.).

In one embodiment, the rotor actuator system 90 includes (i) a first actuator that is configured to (a) reposition the outer rotor 60 into the first position when a braking condition is not present and/or (b) reposition the outer rotor 60 into the second position when the braking condition is present and (ii) a second actuator that is configured to (a) reposition the inner rotor 70 into the third position when a braking condition is not present and/or (b) reposition the inner rotor 70 into the fourth position when the braking condition is present. In another embodiment, the rotor actuator system 90 includes a single actuator that is configured to (i) reposition the outer rotor 60 into the first position and the inner rotor 70 into the third position when a braking condition is not present and/or (b) reposition the outer rotor 60 into the second position and the inner rotor 70 into the fourth position when the braking condition is present.

In some embodiments, the rotor actuator system 90 includes (i) one or more first biasing elements positioned to apply a first biasing force to the exterior facing surface of the outer rotor 60 and/or (ii) one or more second biasing elements positioned to apply a second biasing force to the interior facing surface of the inner rotor 70. The one or more first biasing elements may, therefore, bias the outer rotor 60 into the second position and toward engagement with the outer brake pad 82, and the one or more second biasing elements may, therefore, bias the inner rotor 70 into the fourth position and toward engagement with the inner brake pad 84. In such embodiments, the actuator(s) (e.g., the single actuator, the first actuator and the second actuator, etc.) of the rotor actuator system 90 is/are configured to (i) apply an actuator force to the interior facing surface of the outer rotor 60 and the exterior facing surface of the inner rotor 70 to overcome the first biasing force of the one or more first biasing elements and the second biasing force of the one or more second biasing elements and force the outer rotor 60 into the first position and the inner rotor 70 into the third position when a braking condition is not present and (ii) reduce or release the actuator force when the braking condition is present such that the first biasing force of the one or more first biasing elements and the second biasing force of the one or more second biasing elements force the outer rotor 60 into the second position and the inner rotor 70 into the fourth position, respectively.

In some embodiments, the rotor actuator system 90 includes (i) one or more first biasing elements positioned to apply a first biasing force to the interior facing surface of the outer rotor 60 and/or (ii) one or more second biasing elements positioned to apply a second biasing force to the exterior facing surface of the inner rotor 70. The one or more first biasing elements may, therefore, bias the outer rotor 60 into the first position and away from engagement with the outer brake pad 82, and the one or more second biasing elements may, therefore, bias the inner rotor 70 into the third position and away from engagement with the inner brake pad 84. In such embodiments, the actuator(s) (e.g., the single actuator, the first actuator and the second actuator, etc.) of the rotor actuator system 90 is/are configured to (i) apply an actuator force to the exterior facing surface of the outer rotor 60 and the interior facing surface of the inner rotor 70 to overcome the first biasing force of the one or more first biasing elements and the second biasing force of the one or more second biasing elements and force the outer rotor 60 into the second position and the inner rotor 70 into the fourth position when a braking condition is present and (ii) reduce or release the actuator force when the braking condition is not present such that the first biasing force of the one or more first biasing elements and the second biasing force of the one or more second biasing elements force the outer rotor 60 into the first position and the inner rotor 70 into the third position, respectively.

Seventh Dual Rotor Assembly Design

Figure 14:
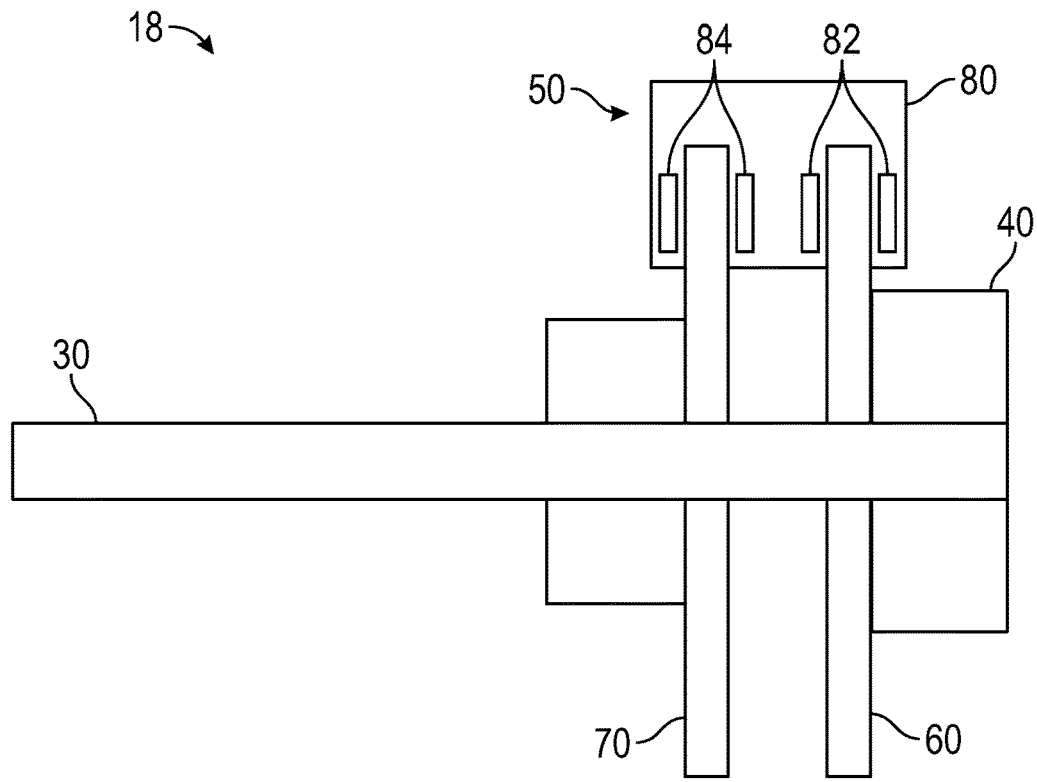
FIG. 14 is a cross-sectional view of an axle and brake assembly of the vehicle of FIG. 1 with the brake assembly in a first, non-braking configuration, according to another exemplary embodiment.
Figure 15:
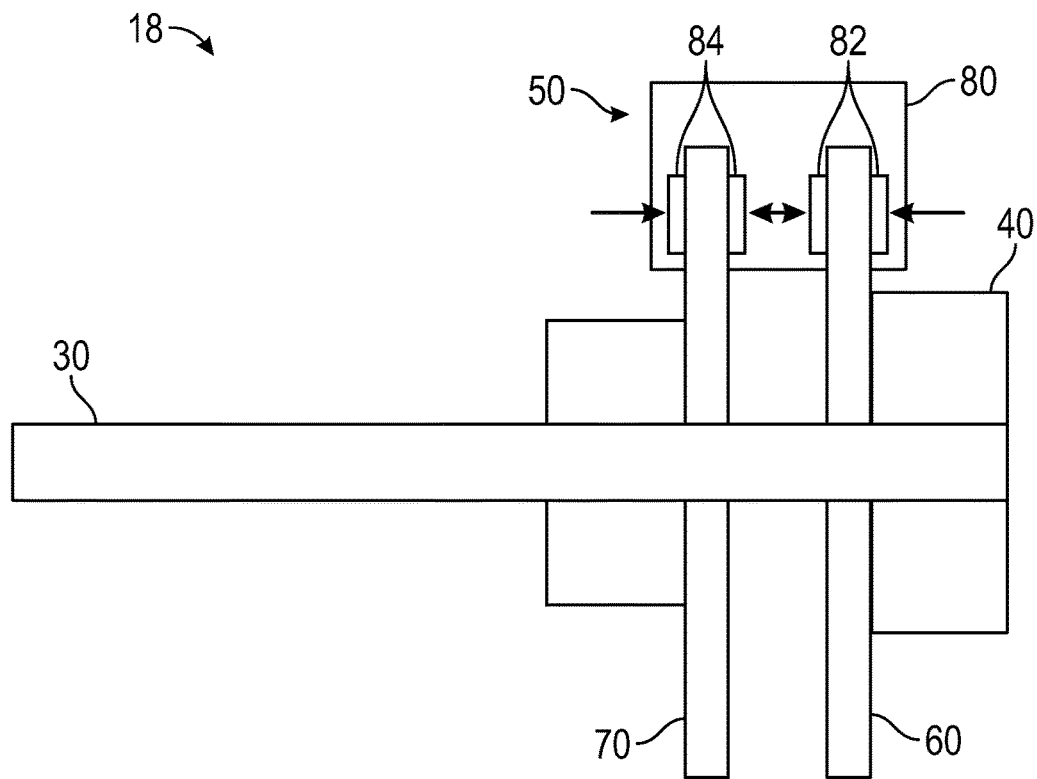
FIG. 15 is a cross-sectional view of the axle and brake assembly of FIG. 14 with the brake assembly in a second, braking configuration, according to an exemplary embodiment.

According to the exemplary embodiment shown in FIGS. 14 and 15, the braking assembly 50 does not include the rotor actuator system 90, and the outer rotor 60 and the inner rotor are fixed along the axle 30. In some embodiments, the outer rotor 60 and the wheel hub 40 are integrally formed. In some embodiments, the outer rotor 60 is separate from the wheel hub 40 and spaced therefrom. As shown in FIGS. 14 and 15, the brake caliper 80 includes (i) a pair of outer brake pads 82, one positioned on each side of the outer rotor 60, and (ii) a pair of inner brake pads 84, one positioned on each side of the inner rotor 70. According to the exemplary embodiment shown in FIGS. 14 and 15, the brake caliper 80 is configured as a single caliper unit that spans both the outer rotor 60 and the inner rotor 70. In another embodiment, the brake caliper 80 is configured as a dual caliper unit having (i) a first or outer caliper including the pair of outer brake pads 82 and that is associated with the outer rotor 60 and (ii) a second or inner caliper including the pair of inner brake pads 84 and that is associated with the inner rotor 70. In still another embodiment, the brake caliper 80 is configured as a dual caliper unit having (i) a first or outer caliper including the exterior outer brake pad 82 and the exterior inner brake pad 84 and (ii) a second or inner caliper including the interior outer brake pad 82 and the interior inner brake pad 84. The first or outer caliper and the second or inner caliper can be engaged together or separately (e.g., to provide varied levels of braking, etc.).

The brake caliper 80 is configured to facilitate repositioning (i) the pair of outer brake pads 82 from a first position or disengaged position (as shown in FIG. 14) to a second position or engaged position (as shown in FIG. 15) and (ii) pair of inner brake pads 84 from a third position or disengaged position (as shown in FIG. 14) to a fourth position or engaged position (as shown in FIG. 15) by clamping down on the outer rotor 60 and the inner rotor 70 when a braking condition is present (e.g., an operator of the vehicle 10 pressing a brake pedal, auto-braking by a control system, etc.). The outer brake pads 82 may be engaged with or separate from the inner brake pads 84 (e.g., to provide varied levels of braking, etc.).

Single Rotor

Figure 16:
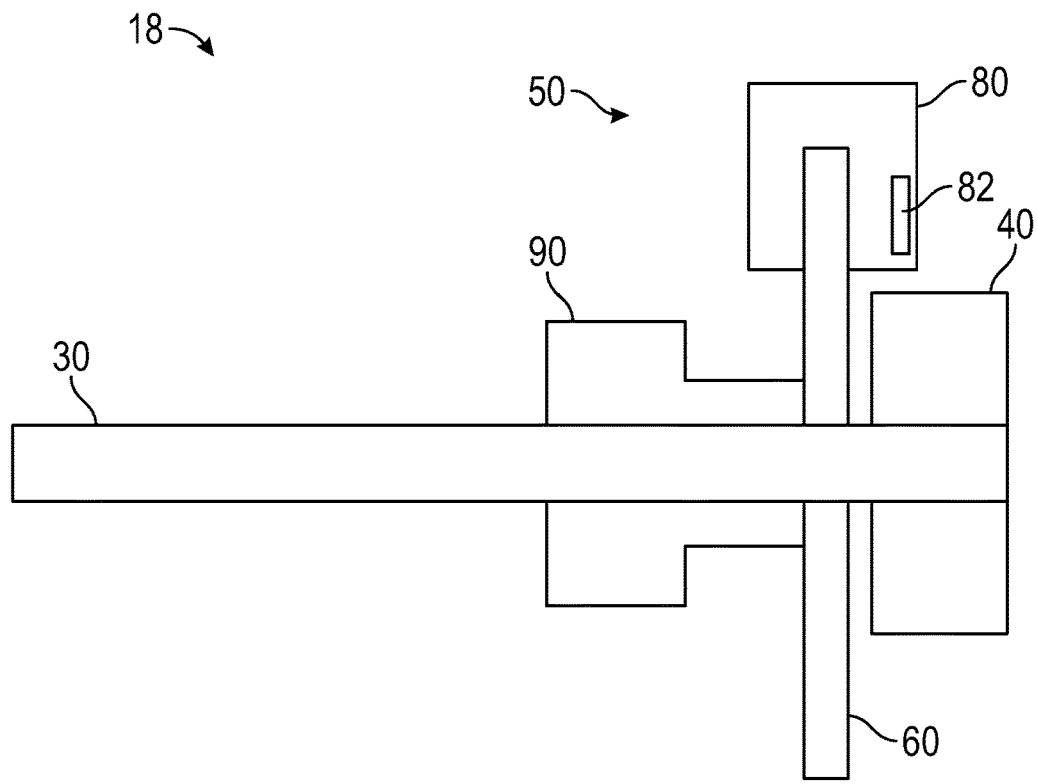
FIG. 16 is a cross-sectional view of an axle and brake assembly of the vehicle of FIG. 1 with the brake assembly in a first, non-braking configuration, according to another exemplary embodiment.
Figure 17:
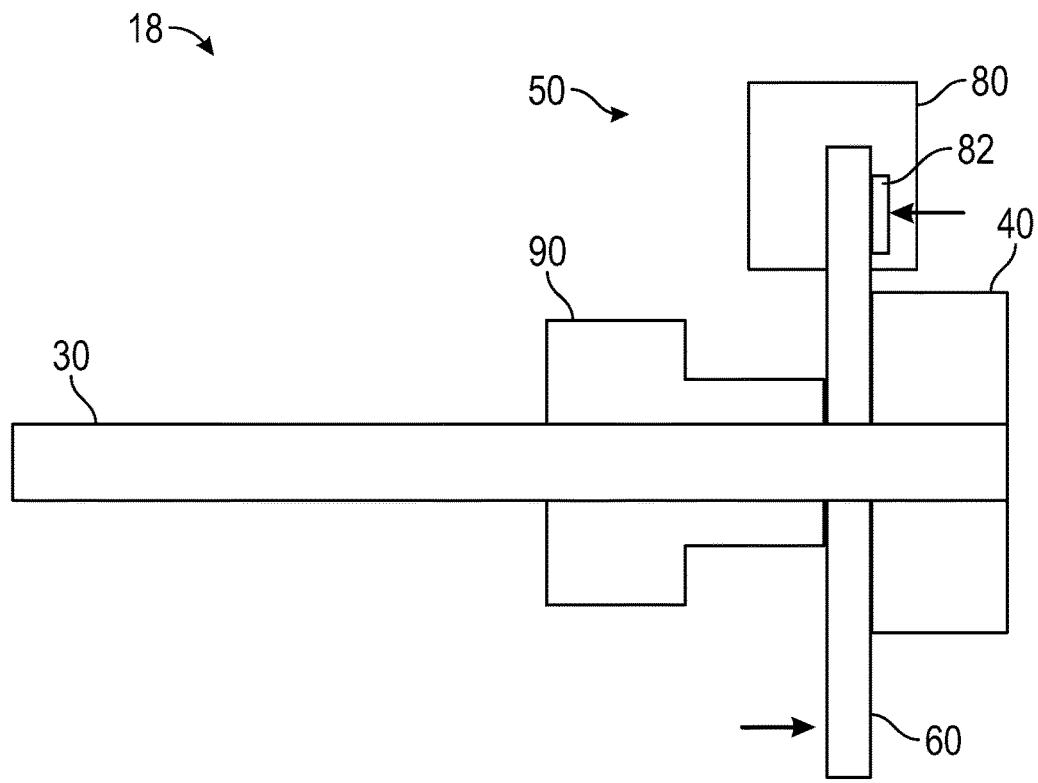
FIG. 17 is a cross-sectional view of the axle and brake assembly of FIG. 16 with the brake assembly in a second, braking configuration, according to an exemplary embodiment.

According to the exemplary embodiment shown in FIGS. 16 and 17, the braking assembly 50 includes a single rotor assembly including the outer rotor 60 that is translatable along the axle 30 (i.e., between the first position and the second position). As shown in FIGS. 16 and 17, the brake caliper 80 includes the outer brake pad 82 positioned proximate the exterior facing surface of the outer rotor 60. The rotor actuator system 90 is configured to facilitate repositioning the outer rotor 60 from the first position or disengaged position (as shown in FIG. 16) to the second position or engaged position (as shown in FIG. 17) to translate the outer rotor 60 toward the outer brake pad 82 when a braking condition is present (e.g., an operator of the vehicle 10 pressing a brake pedal, auto-braking by a control system, etc.). In another embodiment, the brake caliper 80 does not include the outer brake pad 82, but instead includes the inner brake pad 84 positioned proximate the interior facing surface of the outer rotor 60. In still another embodiment, the brake caliper 80 includes the outer brake pad 82 and the inner brake pad 84.

When the rotor actuator system 90 repositions the outer rotor 60 to the second position, the brake caliper 80 may be simultaneously engaged such that the outer brake pad 82 is compressed against the exterior facing surface of the outer rotor 60 by the brake piston. In some embodiments, the outer brake pad 82 is fixed and the exterior facing surface of the outer rotor 60 engages with the outer brake pad 82 when the outer rotor 60 is translated to the second position by the rotor actuator system 90.

In one embodiment, the rotor actuator system 90 includes an actuator that is configured to (i) reposition the outer rotor 60 into the first position when a braking condition is not present and (ii) reposition the outer rotor 60 into the second position when the braking condition is present.

In another embodiment, the rotor actuator system 90 includes the actuator and one or more biasing elements positioned to apply a biasing force to the interior facing surface of the outer rotor 60. The one or more biasing elements may, therefore, bias the outer rotor 60 into the second position and toward engagement with the outer brake pad 82. In such an embodiment, the actuator of the rotor actuator system 90 is configured to (i) apply an actuator force to the exterior facing surface of the outer rotor 60 to overcome the biasing force of the one or more biasing elements and force the outer rotor 60 into the first position when a braking condition is not present and (ii) reduce or release the actuator force when the braking condition is present such that the biasing force of the one or more biasing elements forces the outer rotor 60 into the second position.

In still another embodiment, the rotor actuator system 90 includes the actuator and one or more biasing elements positioned to apply a biasing force to the exterior facing surface of the outer rotor 60. The one or more biasing elements may, therefore, bias the outer rotor 60 into the first position and away from engagement with the outer brake pad 82. In such an embodiment, the actuator of the rotor actuator system 90 is configured to (i) apply an actuator force to the interior facing surface of the outer rotor 60 to overcome the biasing force of the one or more biasing elements and force the outer rotor 60 into the second position when a braking condition is present and (ii) reduce or release the actuator force when the braking condition is not present such that the biasing force of the one or more biasing elements forces the outer rotor 60 into the first position.

Control System

Figure 18:
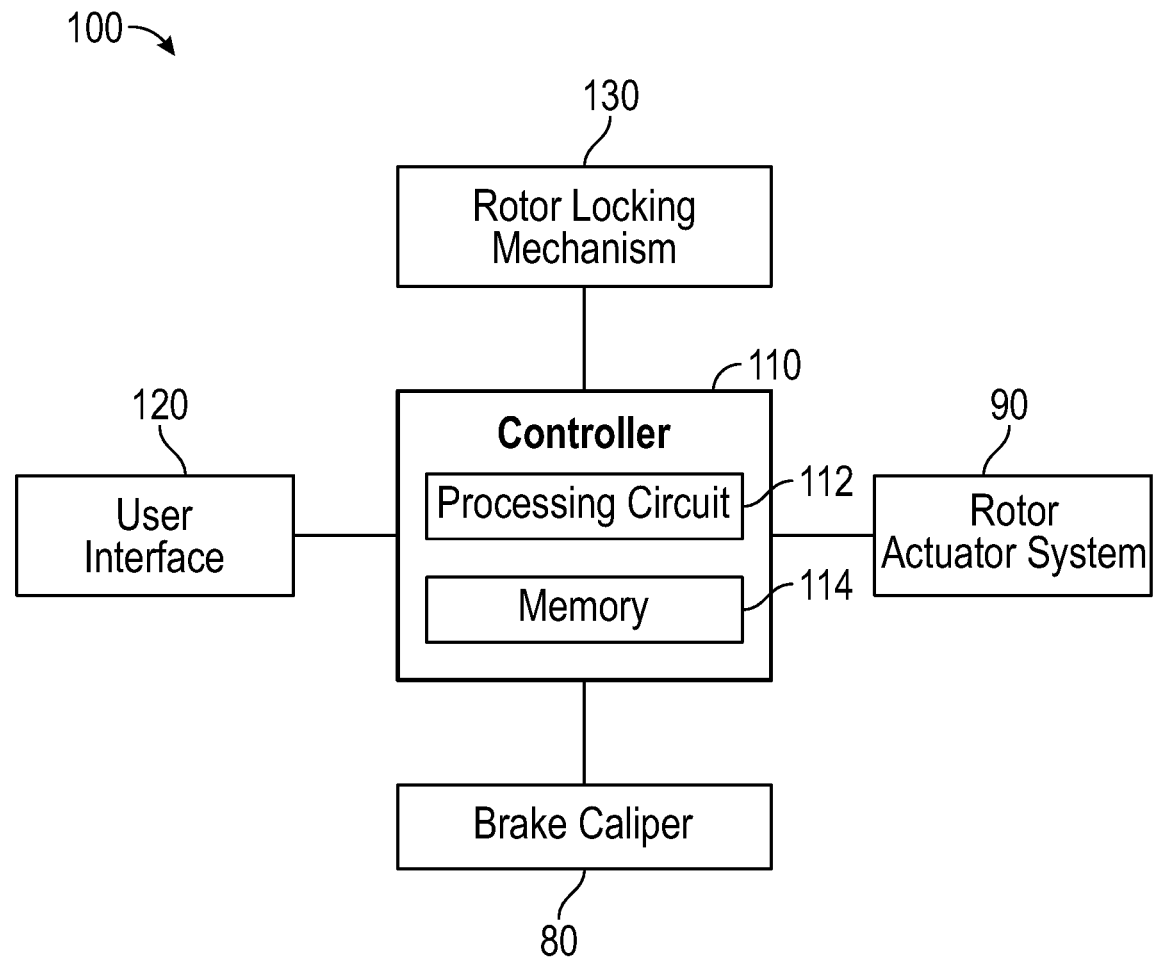
FIG. 18 is a schematic block diagram of a control system of the vehicle of FIG. 1, according to an exemplary embodiment.

As shown in FIG. 1, the vehicle 10 includes a control system 100. According to the exemplary embodiment shown in FIG. 18, the control system 100 includes a controller 110. In one embodiment, the controller 110 is configured to selectively engage, selectively disengage, control, or otherwise communicate with components of the vehicle 10. As shown in FIG. 18, the controller 110 is coupled to (e.g., communicably coupled to) components of the vehicle 10 including the brake caliper 80, the rotor actuator system 90, a user input/output device, shown as user interface 120, and a locking mechanism, shown as rotor locking mechanism 130. By way of example, the controller 110 may send and receive signals (e.g., control signals) with the brake caliper 80, the rotor actuator system 90, the user interface 120, the rotor locking mechanism 130, and/or still other components of the vehicle 10 (e.g., sensors, etc.).

The controller 110 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 18, the controller 110 includes a processing circuit 112 and a memory 114. The processing circuit 112 may include an ASIC, one or more FPGAs, a DSP, circuits containing one or more processing components, circuitry for supporting a microprocessor, a group of processing components, or other suitable electronic processing components. In some embodiments, the processing circuit 112 is configured to execute computer code stored in the memory 114 to facilitate the activities described herein. The memory 114 may be any volatile or non-volatile computer-readable storage medium capable of storing data or computer code relating to the activities described herein. According to an exemplary embodiment, the memory 114 includes computer code modules (e.g., executable code, object code, source code, script code, machine code, etc.) configured for execution by the processing circuit 112. In some embodiments, the controller 110 may represent a collection of processing devices (e.g., servers, data centers, etc.). In such cases, the processing circuit 112 represents the collective processors of the devices, and the memory 114 represents the collective storage devices of the devices.

In some embodiments, the controller 110 is configured to control the brake caliper 80, the rotor actuator system 90, and/or the rotor locking mechanism 130 based on an input from the user interface 120. By way of example, the user interface 120 may include a brake pedal or a speed reduction button (e.g., for as cruise control system, etc.). When the controller 110 receives an input from the user interface 120 indicating a braking condition (e.g., a depression of the brake pedal, the depression of the speed reduction button, etc.), the controller 110 may be configured to control the brake caliper 80 and/or the rotor actuator system 90, as described herein, to activate braking and slow or stop the vehicle 10. Otherwise, absent the input from the user interface 120, the controller 110 may be configured to control the brake caliper 80 and/or the rotor actuator system 90, as described herein, to deactivate braking. The controller 110 may also be configured to activate the rotor locking mechanism 130 when braking is not active and deactivate the rotor locking mechanism 130 in response to the input.

In some embodiments, the controller 110 is configured to control the brake caliper 80, the rotor actuator system 90, and/or the rotor locking mechanism 130 based on an input from vehicle sensors (e.g., cameras, proximity sensors, LIDAR sensors, etc.). By way of example, the vehicle sensors may be configured to monitor the surroundings of the vehicle 10 and provide a signal when a braking condition is present. The controller 110 may be configured to control the brake caliper 80 and/or the rotor actuator system 90, as described herein, to activate braking and slow or stop the vehicle 10 in response to the signal from the vehicle sensors. Otherwise, absent the signal from the vehicle sensors, the controller 110 may be configured to control the brake caliper 80 and/or the rotor actuator system 90, as described herein, to deactivate braking. The controller 110 may also be configured to activate the rotor locking mechanism 130 when braking is not active and deactivate the rotor locking mechanism 130 in response to the signal.

In some embodiments, the controller 110 is configured to control the brake caliper 80 and/or the rotor actuator system 90 to provide varied levels or degrees of braking power (e.g., based on the severity of a braking signal or input command received by the controller 110, etc.) via the braking assembly 50. By way of example, the controller 110 may be configured to provide a first level of braking by actuating one of (i) the outer rotor 60 and/or the outer brake pad(s) 82 or (ii) the inner rotor 70 and/or the inner brake pad(s) 84. By way of another example, the controller 110 may be configured to provide a second level of braking by actuating both of (i) the outer rotor 60 and/or the outer brake pad(s) 82 and (ii) the inner rotor 70 and/or the inner brake pad(s) 84. By way of still another example, the controller 110 may be configured to provide varied levels of actuation of the outer rotor 60, the outer brake pad(s) 82, the inner rotor 70, the inner brake pad(s) 84 (e.g., more or less compression thereof, etc.) to provide the varied levels or degrees of braking power via the braking assembly 50.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle 10, the axle 30, and the braking assembly 50 and components thereof as shown in the various exemplary embodiments is illustrative only. Additionally, any element disclosed in one embodiment may be incorporated or utilized with any other embodiment disclosed herein.

The invention claimed is:

1. A braking system comprising:
   a first rotor;
   a second rotor;
   a braking mechanism including a first brake pad and a second brake pad;
   an actuator system, comprising:
      a first actuator configured to facilitate repositioning the first rotor from a first position where the first rotor does not engage with the first brake pad to a second position where the first rotor engages with the first brake pad to brake a wheel; and
      a second actuator configured to facilitate repositioning the second rotor from a third position where the second rotor does not engage with the second brake pad to a fourth position where the second rotor engages with the second brake pad to brake the wheel;

wherein the first actuator and the second actuator are positioned so as to be separately operable to facilitate:
repositioning of the first rotor without repositioning of the second rotor, and
repositioning of the second rotor without repositioning the first rotor; and
a controller configured to control the actuator system to:
reposition the first rotor from the first position to the second position in response to a braking condition, and
reposition the second rotor from the third position to the fourth position in response to the braking condition.

2. The braking system of claim 1, wherein the first rotor and the second rotor are both translationally repositionable.

3. The braking system of claim 1, wherein a position of the first brake pad and the second brake pad is fixed, and wherein each of the first brake pad and the second brake pad engages with an exterior facing surface of the first rotor or the second rotor, respectively, when the first rotor is at the second position and the second rotor is at the fourth position.

4. The braking system of claim 1, wherein the braking mechanism is configured to facilitate compressing each of the first brake pad and the second brake pad against an exterior facing surface of the first rotor or the second rotor, respectively, when the first rotor is at the second position and the second rotor is at the fourth position.

5. The braking system of claim 1, wherein the first brake pad is configured to move towards the first rotor in response to the braking condition.

6. The braking system of claim 5, wherein the second brake pad is configured to move towards the second rotor in response to the braking condition.

7. The braking system of claim 6, wherein the first and second brake pads are configured to move independently of one another.

8. A braking system comprising:
a first rotor;
a second rotor;
a first brake pad;
a second brake pad;
a first actuator configured to reposition the first rotor between
a first position where the first rotor does not engage with the first brake pad, and
a second position where the first rotor engages with the first brake pad;
a second actuator configured to reposition the second rotor between
a third position where the second rotor does not engage with the second brake pad, and
a fourth position where the second rotor engages with the second brake pad;
at least one brake caliper,
wherein the at least one brake caliper is configured to reposition the first brake pad between
a fifth position where the first brake pad does not engage with the first rotor, and
a sixth position where the first brake pad engages with the first rotor; and a controller configured to:
control the first actuator to move the first rotor from the first position to the second position in response to a braking condition to brake a wheel,
control the second actuator to move the second rotor from the third position to the fourth position in response to the braking condition to brake the wheel, and
control the at least one brake caliper to move the first brake pad from the fifth position to the sixth position in response to the braking condition to brake the wheel.

9. The braking system of claim 8, wherein the first actuator is configured to translate the first rotor between the first position and the second position.

10. The braking system of claim 9, wherein the second actuator is configured to translate the second rotor between the third position and the fourth position.

11. The braking system of claim 8, wherein the at least one brake caliper is configured to reposition the second brake pad between
a seventh position where the second brake pad does not engage with the second rotor, and
an eighth position where the second brake pad engages with the second rotor.

12. The braking system of claim 11, wherein the controller is configured to control the at least one brake caliper to move the second brake pad from the seventh position to the eighth position in response to the braking condition.

13. The braking system of claim 12, wherein the at least one brake caliper is configured to translate the second brake pad between the seventh position and the eighth position.

14. The braking system of claim 11, wherein the first and second brake pads are independently repositionable.

15. The braking system of claim 11, wherein the at least one brake caliper comprises a first brake caliper and a second brake caliper,
wherein the first brake caliper is configured to move the first brake pad between the fifth and sixth positions, and
wherein the second brake caliper is configured to move the second brake pad between the seventh and eighth positions.

16. The braking system of claim 8, wherein the first brake pad is configured to move into and out of contact with a first face of the first rotor.

17. The braking system of claim 16, wherein the second brake pad is configured to move into and out of contact with a second face of the second rotor.

18. The braking system of claim 8, wherein each of the first rotor and the second rotor are independently repositionable.

19. The braking system of claim 8, further comprising:
a biasing assembly,
wherein the biasing assembly biases the first rotor towards the first position.

20. The braking system of claim 8, further comprising:
a biasing assembly,
wherein the biasing assembly biases the first rotor towards the second position.

* * * * *